(12) United States Patent
Kwon et al.

(10) Patent No.: US 10,334,526 B2
(45) Date of Patent: *Jun. 25, 2019

(54) COMMUNICATION METHOD OF A TERMINAL AND AN ACCESS POINT FOR POWER SAVING

(71) Applicant: Samsung Electronics Co., Ltd., Suwon-si (KR)

(72) Inventors: Ui Kun Kwon, Hwaseong-si (KR); Young Soo Kim, Seoul (KR); Patil Sandhya, Bangalore (IN); Anirudh Bhatt, Bangalore (IN); Chunhui (Allan) Zhu, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/153,994

(22) Filed: May 13, 2016

(65) Prior Publication Data

US 2016/0255586 A1 Sep. 1, 2016

Related U.S. Application Data

(63) Continuation of application No. 14/529,521, filed on Oct. 31, 2014, now Pat. No. 9,344,965, which is a (Continued)

(30) Foreign Application Priority Data

Mar. 9, 2010 (IN) .............................. 622/CHE/2010
Aug. 17, 2010 (IN) ........................... 2361/CHE/2010
Feb. 17, 2011 (KR) ........................ 10-2011-0014065

(51) Int. Cl.
*G06F 1/32* (2019.01)
*H04W 52/02* (2009.01)
*H04W 76/20* (2018.01)

(52) U.S. Cl.
CPC ... *H04W 52/0225* (2013.01); *H04W 52/0235* (2013.01); *H04W 76/20* (2018.02);
(Continued)

(58) Field of Classification Search
None
See application file for complete search history.

(56) References Cited

U.S. PATENT DOCUMENTS 7,733,835 B2 6/2010 Sammour et al.
8,472,383 B1 6/2013 Banerjea et al.
(Continued)

FOREIGN PATENT DOCUMENTS

CN 1679369 A 10/2005
CN 101300788 A 11/2008
(Continued)

OTHER PUBLICATIONS

"Draft Amendment to IEEE Standard for Local and metropolitan area networks Part 16: Air Interface for Broadband Wireless Access Systems ; P80216Rev2_D9a", IEEE Draft; P80216REV2_D9A, IEEE-SA, Piscataway, NJ USA, vol. 802.16, Mar. 18, 2009, pp. 1-2098, XP017635117.
(Continued)

*Primary Examiner* — Paul B Yanchus, III
(74) *Attorney, Agent, or Firm* — NSIP Law

(57) ABSTRACT

Provided is a communication technology of an access point and a terminal that may decrease power consumption by changing an operation state of the terminal from an awake state to a sleep state when a data stream to be transmitted to the terminal is absent or has completed in a transmission opportunity (TXOP) duration.

14 Claims, 15 Drawing Sheets

Related U.S. Application Data continuation of application No. 13/043,643, filed on Mar. 9, 2011, now Pat. No. 8,904,207.

(60) Provisional application No. 61/412,489, filed on Nov. 11, 2010, provisional application No. 61/417,528, filed on Nov. 29, 2010.

(52) U.S. Cl.
CPC .......... *Y02D 70/142* (2018.01); *Y02D 70/144* (2018.01); *Y02D 70/164* (2018.01)

(56) References Cited

U.S. PATENT DOCUMENTS

| | | |
|---|---|---|
| 8,630,272 B2 | 1/2014 | Park et al. |
| 2005/0136914 A1 | 6/2005 | van Kampen et al. |
| 2005/0213534 A1 | 9/2005 | Benveniste |
| 2006/0029024 A1 | 2/2006 | Zeng et al. |
| 2006/0171341 A1 | 8/2006 | Wang et al. |
| 2006/0252443 A1 | 11/2006 | Sammour et al. |
| 2007/0037548 A1 | 2/2007 | Sammour et al. |
| 2007/0058605 A1 | 3/2007 | Meylan et al. |
| 2007/0191052 A1 | 8/2007 | Kneckt et al. |
| 2007/0297373 A1 | 12/2007 | Saifullah et al. |
| 2008/0095091 A1 | 4/2008 | Surineni et al. |
| 2008/0225811 A1 | 9/2008 | Wentink |
| 2009/0122768 A1 | 5/2009 | Nakashima et al. |
| 2009/0310692 A1 | 12/2009 | Kafle et al. |
| 2010/0029325 A1 | 2/2010 | Wang et al. |
| 2010/0039973 A1 | 2/2010 | Cavalcanti et al. |
| 2010/0074190 A1 | 3/2010 | Cordeiro et al. |
| 2010/0165959 A1 | 7/2010 | Park et al. |
| 2010/0177712 A1 | 7/2010 | Kneckt et al. |
| 2010/0189024 A1 | 7/2010 | Xhafa et al. |
| 2010/0278136 A1 | 11/2010 | Oyman et al. |
| 2011/0116487 A1 | 5/2011 | Grandhi |

FOREIGN PATENT DOCUMENTS

| | | |
|---|---|---|
| CN | 101366241 A | 2/2009 |
| CN | 101529824 A | 9/2009 |
| CN | 101584229 A | 11/2009 |
| EP | 2 170 009 A1 | 3/2010 |
| JP | 2009-523372 A | 6/2009 |
| JP | 2009-528745 A | 8/2009 |
| JP | 2010-507349 A | 3/2010 |
| JP | 2012-500605 A | 1/2012 |
| KR | 10-2008-0066074 A | 7/2008 |
| KR | 10-2009-0082227 A | 7/2009 |
| WO | WO 2006/115999 A2 | 11/2006 |
| WO | WO 2007/081683 A2 | 7/2007 |
| WO | WO 2007/085948 A2 | 8/2007 |
| WO | WO 2008/149598 A1 | 12/2008 |
| WO | WO 2009/015170 A1 | 1/2009 |
| WO | WO 2010/022255 A1 | 2/2010 |

OTHER PUBLICATIONS

Kim, Joonsuk, "GroupID in VHT-SIG Field." IEEE 802.11-10/0582r1, IEEE <URL: https://mentor.ieee.org/802.11/dcn/10/11-10-0582-01-00ac-groupid-in-vht-sig-field.ppt>, May 17, 2010.

Shadi Abu-Surra: "PHY/MAC Complete Proposal Specification", IEEE 802.11-10/0433R2, May 18, 2010, pp. 45-53, XP055176773.

Zhu, C. et al., "Txop Enhancement for DL MU-MIMO Support," doc. IEEE 802.11-10/0591r0, May 18, 2010 (8 pages).

Kang, Byeongwoo, "PHY Power Saving Features for 11 ac," IEEE 802.11-10/0785r1, IEEE, <URL: https://mentor.ieee.org/802.11/dcn/10/11-10-0785-01-00ac-phy-power-saving-features-for-11ac.ppt>, Jul. 2010

IEEE 802.11-09/0992r13, 802.11 wireless LAN. specification framework for TGac, Jul. 2010 (21 pages).

IEEE 802.11-10/876r0, 802.11ac preamble, Jul. 13, 2010 (18 pages).

Erceg, V. et al., "TGac PHY AdHoc Report," doc. IEEE 802.11-10/0571r8, Jul. 16, 2010 (188 pages).

Stacey, R. et al., "Specification Framework for TGac," IEEE 802.11 doc# 11-09/0992r15, Sep. 2010 (36 pages).

Sandhya, P. et al., "DL MU TXOP Power Save," IEEE 802.11 doc# 11-10/1302r0, Nov. 7, 2010 (16 pages).

Patil, Sandhya et al., *Downlink TXOP Power Save*, Jan. 17, 2011 (9 pages in English).

International Search Report dated Oct. 27, 2011, in counterpart International Application No. PCT/KR2011/001625 (3pp).

Japanese Office Action dated Dec. 2, 2014 in counterpart Japanese Application No. JP 2012-556976. (6 pages, in Japanese, 6 pages, in English).

Extended European Search Report dated Feb. 17, 2015 in European Patent Application No. 14192820.0 (9 pages).

U.S. Office Action dated Mar. 18, 2015 in counterpart U.S. Appl. No. 14/618,601 (20 pages).

Extended European Search Report dated May 29, 2015 in counterpart European Application No. 14194347.2 (12 pages).

Japanese Office Action dated Jun. 16, 2015 in counterpart Japanese Application No. 2013-524777 (3 pages in English, 3 pages in Japanese).

U.S. Final Rejection dated Sep. 3, 2015 in counterpart U.S. Appl. No. 14/618,601 (17 pages).

Japanese Office Action dated Jan. 12, 2016 in counterpart Japanese Application No. (5 pages with English translation).

Japanese Office Action dated Mar. 8, 2016 in counterpart Japanese Patent Application No. 2013-524777 (pp. 1-4 in English; pp. 5-8 in Japanese).

Extended European Search Report dated May 10, 2016 in counterpart European Application No. 16151347.8.

Chinese Office Action dated Mar. 21, 2018 for corresponding Chinese Patent Application No. 201510800622.7 (14 pages in English, 9 pages in Chinese).

Chinese Office Action dated Jul. 17, 2018 in Chinese Patent Application No. 201610086280.1 (20 pages in English, 13 pages in Chinese).

COMMUNICATION METHOD OF A TERMINAL AND AN ACCESS POINT FOR POWER SAVING

CROSS-REFERENCE TO RELATED APPLICATION(S)

This present application is a continuation of U.S. patent application Ser. No. 14/529,521 filed Oct. 31, 2014, which is a continuation of U.S. patent application Ser. No. 13/043,643 filed Mar. 9, 2011, which claims the benefit under 35 U.S.C. § 119(e) of U.S. Provisional Application No. 61/412,489, filed on Nov. 11, 2010, and U.S. Provisional Application No. 61/417,528, filed on Nov. 29, 2010, both of which were filed in the United States Patent and Trademark Office, and claims the benefit under 35 U.S.C. § 119(a) of India Patent Application No. 622/CHE/2010, filed on Mar. 9, 2010, and No. 2361/CHE/2010, filed on Aug. 17, 2010, both of which were filed in the Intellectual Property Office of India, and Korean Patent Application No. 10-2011-0014065, filed on Feb. 17, 2011, in the Korean Intellectual Property Office, the entire disclosures of which are incorporated herein by reference for all purposes.

BACKGROUND

1. Field

The following description relates to communication methods and a terminal and an access point for power saving.

2. Description of Related Art

Mobile terminals such as smart phones allow a user to simultaneously perform a variety of functions, for example, making a call, playing a motion picture, playing back a music file, viewing a digital multimedia broadcasting (DMB), a digital camera function, Bluetooth, wireless Internet access, and the like, using a single terminal.

In addition, as the data rate of a mobile communication networks, Bluetooth, wireless Internet, and the like, increases, power consumption of a terminal may also increase. Accordingly, there is a desire for a communication method that may employ a high capacity battery for a terminal, and may decrease power consumption by the terminal.

SUMMARY

In one general aspect, there is provided a communication method of a terminal in a wireless network comprising an access point and a plurality of terminals, the method including: setting a power management mode of the terminal to a power saving mode during a transmission opportunity (TXOP) duration in which the access point transmits at least one frame comprising data streams to the plurality of terminals, receiving information from the access point, and determining an operation state of the terminal in the power saving mode by determining whether at least one predetermined criterion is satisfied based on the information received from the access point.

The method may further comprise transmitting information associated with the power management mode to the access point.

The method may further comprise determining whether to change the operation state of the corresponding terminal based on whether at least one of the predetermined criterion is satisfied, using an enabling bit included in each of the at least one frame transmitted from the access point.

The method may further comprise prior to setting, attempting to operate in the power saving mode by transmitting, to the access point, a frame in which the power management mode is set to the power saving mode, and receiving, from the access point, an acknowledgment (ACK) as a response with respect to the frame in which the power saving mode is set to the power saving mode, wherein the setting comprises setting the power management mode to the power saving mode during the TXOP duration based on whether the ACK is received from the access point.

The method may further comprise receiving, from the access point, a TXOP setting frame comprising information associated with the TXOP duration, determining whether the terminal is a terminal to receive a data stream during the TXOP based on the TXOP setting frame, and transmitting a response frame with respect to the TXOP setting frame based on the determination result.

The operation state of the terminal may comprise one of an awake state and a sleep state, and the determining may comprise determining whether at least one of the predetermined criterion is satisfied based on information received from the access point, and changing the operation state of the corresponding terminal from the awake state to the sleep state in response to at least one of the predetermined criterion being satisfied.

The predetermined criterion may comprises a first criterion, a second criterion, and a third criterion, and if a group ID of the group indicates that the corresponding terminal is not a member of the group, the first criterion may be satisfied, if the group ID indicates that the corresponding terminal is a member of the group, and if a data stream corresponding to the corresponding terminal is not to be transmitted from the access point during the TXOP, the second criterion may be satisfied, and if the corresponding terminal receives an indicator indicating that there are no more additional data streams to be transmitted to the terminal during the TXOP, the third criterion may be satisfied.

The method may further comprise maintaining the operation state of the corresponding terminal in a sleep state for the remainder of the TXOP duration after terminating receiving of the data stream according to the indicator, or after transmitting, to the access point, a block ACK with respect to the data stream.

In another aspect, there is provided a communication method of an access point in a wireless network comprising the access point and a plurality of terminals, the method including: transmitting, to the plurality of terminals, information associated with a transmission opportunity (TXOP) duration in which the access point obtains a TXOP with respect to a channel, in response to at least one terminal setting a power management mode to the power saving mode during the TXOP duration, transmitting information for the at least one terminal to use to determine an operation state of the at least one terminal in power saving mode, and transmitting the data streams to the terminals during the TXOP duration based on the operation state of each of the terminals in the power saving mode.

The method may further comprise transmitting, to the terminals, information about whether the access point is capable of supporting the power saving mode, or information associated with a support capability of the access point for the power saving mode.

The transmitting of the information may comprise transmitting, to the terminals, a TXOP setting frame comprising information associated with the TXOP duration, and the TXOP setting frame may be generated to be decodable by a terminal having set the power management mode to the power saving mode and a terminal having not set the power management mode to the power saving mode.

The method may further comprise receiving, from a terminal desiring to operate in the power saving mode, a frame in which the power management mode is set to the power saving mode, and in response, transmitting, to the terminal, an acknowledgement (ACK) with respect to the frame in which the power management mode is set to the power saving mode.

The method may further comprise generating a group with respect to the terminals based on a quality of service (QoS) between the terminals and a channel condition, and notifying the terminals of information associated with members of the group.

The method may further comprise regrouping the terminals and a predetermined terminal in response to a notification of the predetermined terminal when the predetermined terminal notifies that the predetermined terminal enters the power saving mode.

The method may further comprise replacing, from the group, a predetermined terminal with another terminal when the predetermined terminal enters a sleep state of the power saving modem, and notifying the predetermined terminal of information associated with members of the group updated by the replacement.

The operation state of each of the terminals may comprise one of an awake state and a sleep state, and the transmitting of the data streams may comprise simultaneously transmitting the data streams to terminals in the awake state during the TXOP duration, and buffering a data stream to be transmitted to a terminal in the sleep state for an amount of time remaining in the TXOP duration.

The method may further comprise transmitting the buffered data stream to the terminal in the sleep state when the operation state of the terminal is changed from the sleep state to the awake state.

The information for the terminals to use to determine the operation state in the power saving mode may comprise at least one of a group identifier (ID) of a group comprising each of the terminals, information indicating whether a data stream corresponding to each of the terminals is transmitted from the access point during the TXOP duration, and information indicating whether there is an additional data stream to be transmitted to each of the terminals is during the TXOP.

The method may further comprise generating an indicator indicating whether there is an additional data stream to be transmitted to a corresponding terminal is during the TXOP.

The generating may comprise generating an indicator indicating that there is no additional data stream to be transmitted to the corresponding terminal using a preamble of a packet to be transmitted to the corresponding terminal or a header of a media access control (MAC) frame to be transmitted to the corresponding terminal.

In another aspect, there is provided a computer-readable storage medium comprising program instructions to cause a computer to implement a method including transmitting, to the plurality of terminals, information associated with a transmission opportunity (TXOP) duration in which the access point obtains a TXOP with respect to a channel, in response to at least one terminal setting a power management mode to the power saving mode during the TXOP duration, transmitting information for the at least one terminal to use to determine an operation state of the at least one terminal in power saving mode, and transmitting the data streams to the terminals during the TXOP duration based on the operation state of each of the terminals in the power saving mode.

In another aspect, there is provided a terminal including a receiver configured to receive one or more data frames from an access point during a transmission opportunity (TXOP) of the access point, a controller configured to determine whether one a of a plurality of criterion is satisfied based on data included in the data frame received from the access point, and a power management unit configured to adjust the power mode of the terminal, wherein, if the controller determines that one of the criterion of the plurality of criterion is satisfied, the power management unit adjusts the power mode of the terminal into a power saving mode for the duration of the TXOP.

The first criterion may be satisfied when a group ID of a data frame indicates that the corresponding terminal is not a member of the group for the TXOP.

If a group ID of the data frame indicates that the corresponding terminal is a member of the group, the second criterion may be satisfied if a number of state time space ($N_{STS}$) bit included in a very high throughput signal (VHT-SIG) field of the data frame indicates that the terminal is not going to be transmitted data during the TXOP.

If the group ID of the data frame indicates that the corresponding terminal is a member of the group, and a $N_{STS}$ bit included in a VHT-SIG field of the frame indicates that the terminal is to be transmitted data during the TXOP, the third criterion may be satisfied if a more data bit (MDB) included in a MAC header of the data frame or of another data frame indicates that the transmission of the data to the terminal is completed for the TXOP.

In another aspect, there is provided an access point including a controller configured to determine whether a terminal is included in a TXOP obtained by the access point, and a transmitter configured to transmit data to the terminal that satisfies one of a plurality of criterion, in response to the controller determining that the terminal is not included in some portion of the TXOP.

If the controller determines that the terminal is not included in a group of terminals that the access point is able to transmit to during the TXOP, the transmitter may transmit, to the terminal, a data frame comprising a group ID field that indicates that the terminal is not a member of the group for the TXOP.

If the controller determines that the terminal is included in a group of terminals that the access point is capable of transmitting to during the TXOP, and that the access point does not have data to transmit to the terminal during the TXOP, the transmitter may transmit, to the terminal, a data frame comprising a number of state time space ($N_{STS}$) bit included in a very high throughput signal (VHT-SIG) field of the frame to indicate that the terminal is not going to be transmitted data during the TXOP.

If the controller determines that the terminal is included in a group of terminals that the access point is capable of transmitting to during the TXOP, and that the access point does have data to transmit to the terminal during the TXOP, the transmitter may transmit, to the terminal, a data frame comprising a more data bit (MDB) of a MAC header set to indicate that transmission of data to the terminal is completed.

In another aspect, there is provided a terminal including a controller configured to set a one or more bits of a capability element of a VHT control frame to indicate a power management mode of the terminal, and a transmitter configured to transmit, to an access point, a data frame including the VHT control frame indicating the power management mode of the terminal.

The power management modes may comprise a power saving mode in which the terminal continuously sleeps, a non-power save mode (non-TXOP PS mode) in which the terminal remains continuously awake, and a power save mode (TXOP PS mode) in which the terminal may switch from an awake state to a doze state in which the terminal sleeps, and the one or more bits of the capability element may be set to indicate whether the terminal is in the power saving mode, the non-TXOP PS mode, or the TXOP PS mode.

Other features and aspects may be apparent from the following detailed description, the drawings, and the claims.

Figure 1:
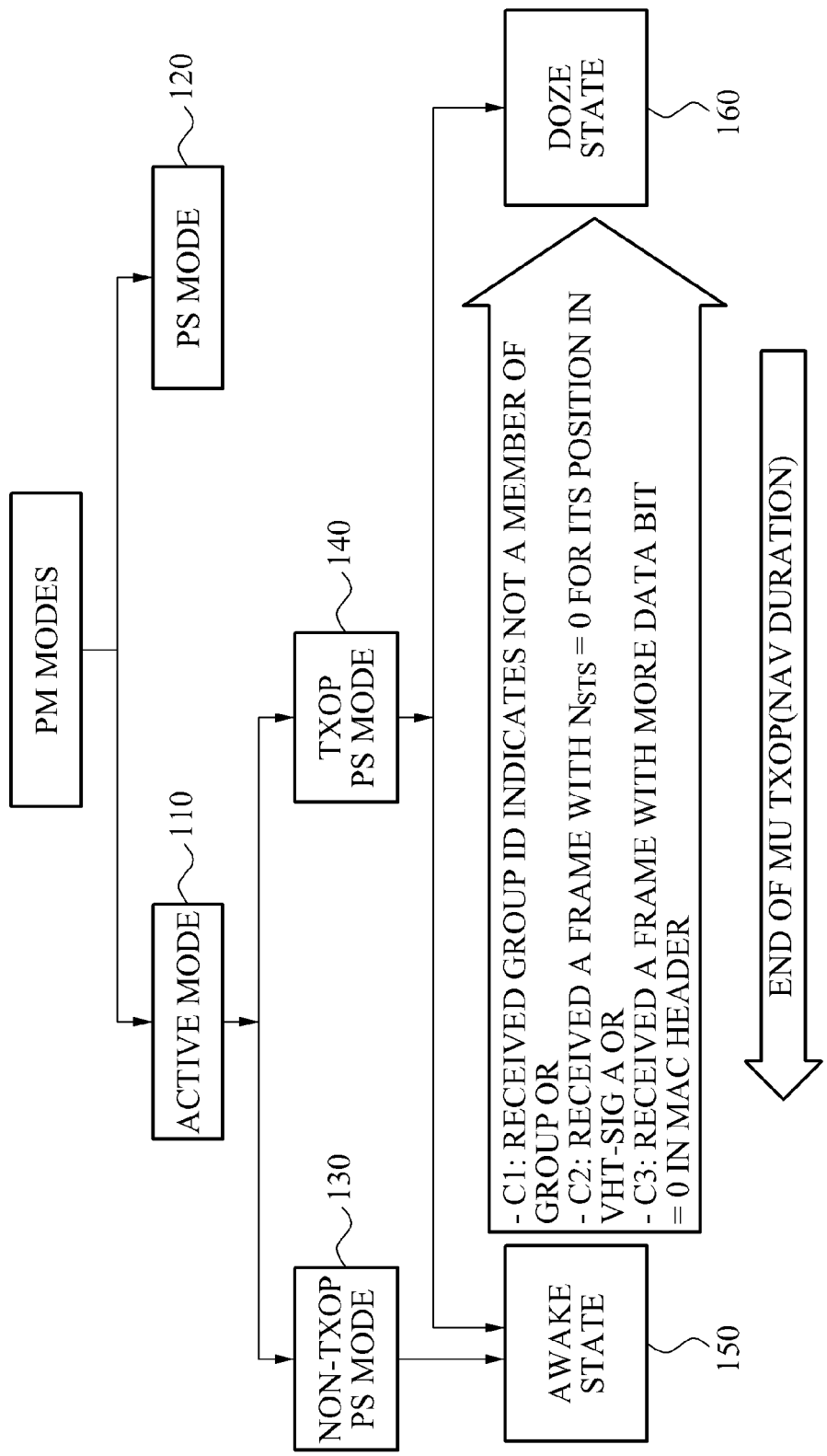
FIG. 1 is a diagram illustrating an example of an operation state of a terminal in a transmission opportunity (TXOP) power saving mode.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

In certain aspects, a terminal may be a single user multiple input multiple output (SU-MIMO) terminal, or a multi-user multiple input multiple output (MU-MIMO) terminal.

FIG. 1 illustrates an example of an operation of a terminal in a transmission opportunity (TXOP) power saving mode.

At least one terminal, for example, a reception apparatus or a station receiving data from an access point may maintain an active mode in order to receive a packet or a frame transmitted to the at least one terminal. The at least one terminal may remain in the active mode in order to overhear a packet to be transmitted to another terminal.

If there is no transmission of data corresponding to the terminal, or when the transmission of data to the terminal is completed, it is possible to save standby time and a receive standby power by adjusting an operation mode or a power management mode of the corresponding terminal. For example, the terminal may switch from an awake state to a sleep or doze state to conserve time and power.

Referring to FIG. 1, a power management mode of a terminal includes an active mode 110 and a power saving (PS) mode 120. While in the active mode 110, the terminal may enter into two power management modes, a non-power save mode (non-TXOP PS mode) in which the terminal stays awake, and a power save mode (TXOP PS mode) in which the terminal may switch between an awake state 150 and doze state 160.

The active mode 110 is a state in which the terminals may be continuously operating to transmit and receive data to and from an access point. The PS mode 120 is a state, for example, an idle state in which the terminal does not operate or a state in which the terminal reduces overall power consumption. A terminal operating in the PS mode 120 may transmit information associated with the operation state of the terminal to the access point using a portion of bits of a control field of a media access control (MAC) header.

In this example, terminals operating in the active mode 110 may be divided into terminals operating in a non-TXOP PS mode 130 and terminals operating in a TXOP PS mode 140.

The terminals operating in the non-TXOP PS mode 130 may maintain an awake state without a separate operation for the power saving. Accordingly, the terminals operating in the non-TXOP PS mode 130 may continuously consume the power for a receive standby time that is used to wait for receiving a packet to be transmitted to corresponding terminals.

The terminals operating in the TXOP PS mode 140 may change an operation state to an awake state 150 or to a sleep state such as a doze state 160, based on whether a predetermined criterion is satisfied.

For example, the predetermined criterion may include a first criterion, a second criterion, and a third criterion. If any one of the criterion is satisfied, a terminal may switch from the awake state 150 to the doze state 160 for the remainder of the TXOP of the access point.

For example, the first criterion may be satisfied if a group identifier (ID) of a group indicates that a corresponding terminal is not a member of the group.

As another example, the second criterion may be satisfied if the group ID of the group indicates that the corresponding terminal is the member of the group, however, a data stream corresponding to the terminal is not going to be transmitted from the access point during the TXOP. In this example, an access point may inform the terminal that a data stream corresponding to the terminal is not going to be transmitted from the access point during the TXOP by setting a number of state time space ($N_{STS}$) included in a very high throughput signal (VHT-SIG) field of a frame to a predetermined value, for example, a value of '0'.

As another example, the third criterion may be satisfied if the group ID of the group indicates the terminal is a member of the group, the terminal receives a data stream during the TXOP, however, the terminal receives an indicator indicating that there is no additional data stream to be transmitted to the terminal during the remainder of the TXOP. That is, the terminal receives an indicator indicating that the data stream sent to the terminal has been completed.

In this example, the indicator indicating that there is no additional data stream to be transmitted to the terminal during the remainder of the TXOP may be a more data bit (MDB) included in a MAC header of a frame received by the terminal from the access point. For example, the MDB of the MAC header may be set to '0' to indicate that no more data streams are to be transmitted to the terminal during the TXOP. That is, the MDB included in the MAC header of the frame may be set to '0' to indicate that transmission of the data stream corresponding to the terminal is completed for that respective TXOP.

A terminal satisfying any one of the aforementioned criterion may save receive standby power for a duration of the remaining time of the TXOP by changing an operation state of the terminal from the awake state 150 to the doze state 160. The TXOP duration may indicate a time duration in which the access point simultaneously transmits data streams to a group of terminals over a respective channel.

A terminal may notify the access point of information associated with a power management mode of the terminal using a VHT control field of a MAC header. For example, the terminal may notify the access point of which power management mode the terminal is in between the non-TXOP PS mode 130 and the TXOP PS mode 140. A method of the terminal notifying the access point of the power management of the terminal is further described with reference to FIG. 13.

For example, a terminal may notify an access point about a power management mode of the terminal using a VHT control field of a MAC header. For example, the power management mode may be the power saving mode 120, the non-TXOP PS mode 130, or the TXOP PS mode 140. The terminal may use one or more bits of the control field to indicate which power saving mode the terminal is in.

In various aspects, the terminal operating in the TXOP PS mode 140 may save power and decrease the power consumption of the terminal by changing the operation state in the TXOP duration based on the predetermined criterion.

Hereinafter, the TXOP PS mode 140 is referred to as a power saving mode.

Figure 2:
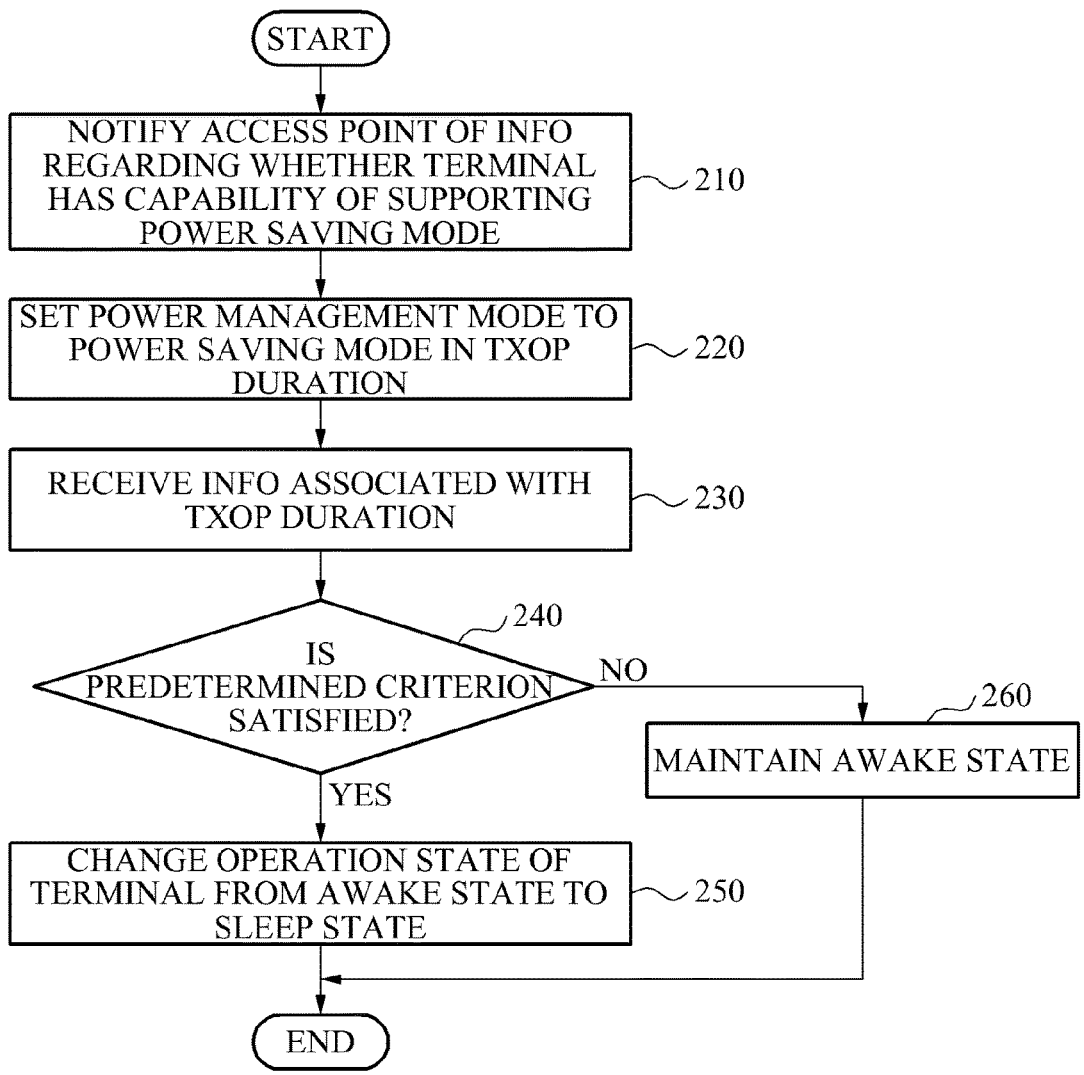
FIG. 2 is a flowchart illustrating an example of a communication method of a terminal.

FIG. 2 illustrates an example of a communication method of a terminal. The communication method of the terminal in a wireless network including an access point and one or more terminals is described with reference to FIG. 2.

In 210, the terminal notifies the access point about whether the terminal has a capability of supporting a power saving mode.

For example, to notify the access point about whether the terminal has the capability of supporting the power saving mode, the terminal may use a single bit of a capability/support element of an association request frame that is transmitted while the terminal is performing an association with the access point. Examples of the bit of the capability/support element are shown in Table 1.

The terminal may verify information associated with a TXOP duration from a TXOP setting frame received from the access point.

In 220, the terminal sets a power management mode to the power saving mode during the duration of the TXOP. Prior to entering the TXOP, the terminal may determine the power management mode of the terminal as described herein with reference to FIG. 1.

The duration of the TXOP may correspond to a time duration in which the access point may transmit at least one frame including data streams to a group including the plurality of terminals via a respective channel. The TXOP duration may correspond to a network allocation vector (NAV) duration.

The terminal may determine an operation state of the terminal as the power saving mode (i.e. doze/sleep state) by determining whether a predetermined criterion is satisfied based on information received from the access point.

The operation state of the terminal in the power saving mode may correspond to one of an awake state and a sleep state.

Information received from the access point may be used when the terminal determines the operation state of the terminal as the power saving mode. For example, information received from the access point may include at least one of a group ID indicating whether the terminal is a member of the group that may receive data from the access point, information indicating whether a data stream corresponding to the corresponding terminal is to be transmitted from the access point during the TXOP, and information indicating whether there is an additional data stream to be transmitted to the terminal during the TXOP.

Whether the data stream corresponding to the terminal is going to be transmitted from the access point during the TXOP may be verified based on an $N_{STS}$ field included in a VHT-SIG-A field. The terminal may verify whether a data stream to be transmitted to the terminal is pending in the access point, based on the $N_{STS}$.

For example, the $N_{STS}$ may be set to '0' to indicate that the there is no data stream to be transmitted to the corresponding to the terminal from the access point during the TXOP. As another example, the $N_{STS}$ may be set to '0' to indicate that there is a data stream corresponding to the terminal that is to be transmitted from the access point during the TXOP duration. As another example, the $N_{STS}$ may be set to a value excluding '0' to indicate that there is a data stream to be transmitted to the corresponding terminal from the access point during the TXOP duration.

Whether there is an additional data stream to be transmitted to the terminal during the TXOP may be verified using, for example, an MDB of a control field of a MAC header. For example, the MDB may be set to '0' to indicate that there is no additional data stream to be transmitted to the terminal during the TXOP. As another example, the MDB may be set to '1' to indicate that an additional data stream will be sent to the terminal. As another example, the MDB may be set to '1' to indicate that there are no more data streams to be transmitted to the terminal during the TXOP.

In 230, the terminal receives information associated with the TXOP duration from the access point.

The terminal may verify information associated with the TXOP duration by checking a duration field of a request to send (RTS) frame received from the access point. In this example, an RTS/clear to send (CTS) frame may be initially transmitted before the TXOP duration starts and the terminal may receive information associated with the TXOP duration.

To determine the TXOP duration, the terminal may utilize the RTS/CTS frame, a self CTS frame, a duration field, and the like.

A duration field of the RTS/CTS frame may correspond to a TXOP time period.

For example, the self CTS frame may be used for a downlink MU-MIMO. The access point may transmit the self CTS frame prior to transmitting data frames to the terminals included in the group. A duration bit of the self CTS frame may indicate a TXOP duration.

As another example, a duration value may be expressed by bits of a VHT-SIG-A field of a preamble.

In 240, the terminal determines whether a predetermined criterion is satisfied based on information received from the access point.

In response to the predetermined criterion being satisfied, the terminal changes the operation state of the corresponding terminal from the awake state to the sleep state for the remainder of the TXOP duration, in 250. In response to changing the operation state to the sleep state, for example, the terminal may decrease power consumption such as the receive standby power consumption and the data receive power consumption by maintaining the sleep state for the remainder of the TXOP duration.

In response to the predetermined criterion not being satisfied, in 260 the terminal maintains the operation state of the terminal as the awake state.

For example, the predetermined criterion may include a first criterion, a second criterion, and a third criterion, as described with reference to FIG. 1.

When the group ID of the group indicates that the terminal is not a member of the group, the first criterion may be satisfied. For example, it may be assumed that the terminal is a terminal 4, and a group having a group ID of 'A' includes a terminal 1, a terminal 3, and a terminal 5. In this example, because terminal 4 is not included in the group A, the terminal is not a member of the group A. Accordingly, the first criterion is satisfied.

When the group ID of the group indicates that the corresponding terminal is a member of the group, however, a data stream corresponding to the terminal is not going to be transmitted from the access point during the TXOP, the second criterion may be satisfied. In this example, the access point may indicate that there is no data stream to be transmitted to the corresponding terminal from the access point during the TXOP based on a value of an $N_{STS}$ field included in a VHT-SIG-A field of a frame.

As another example, the third criterion may be satisfied if the group ID of the group indicates the terminal is a member of the group, the terminal receives a data stream during the TXOP, but the terminal receives an indicator indicating that there is no additional data stream to be transmitted to the terminal during the TXOP. In this example, the indicator may be an MDB of a MAC header.

Figure 3:
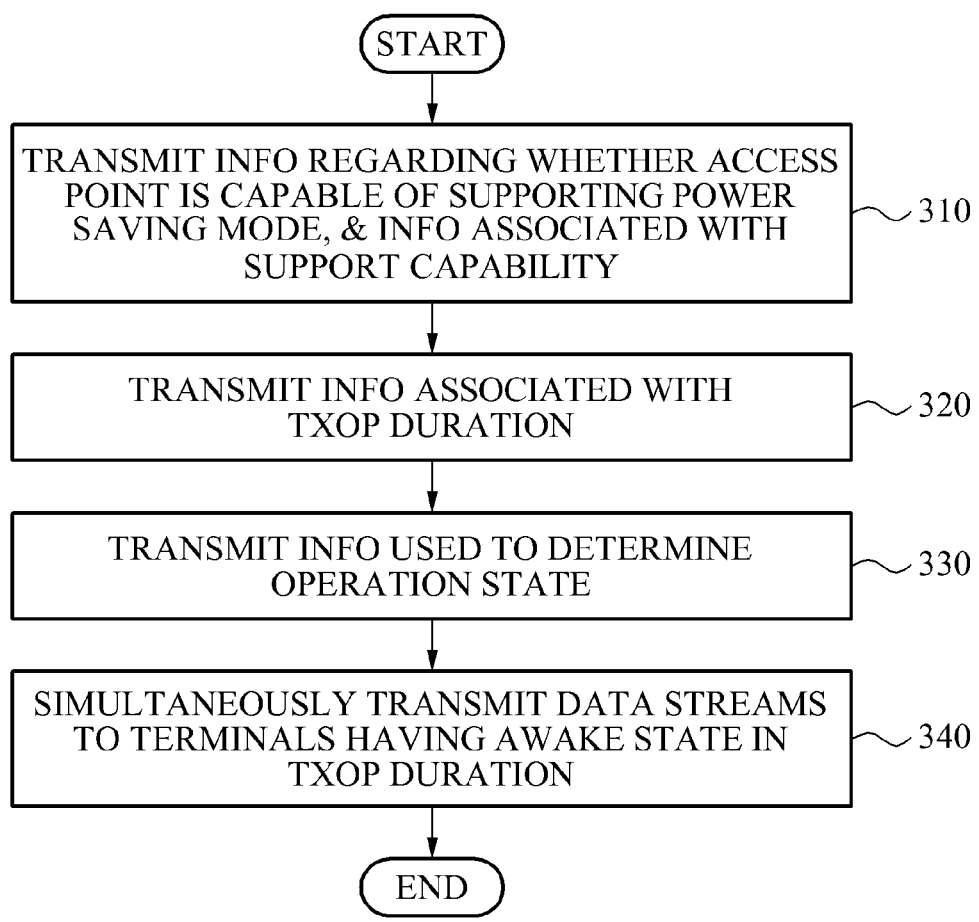
FIG. 3 is a flowchart illustrating an example of a communication method of an access point.

FIG. 3 illustrates an example of a communication method of an access point. The communication method of the access point in a wireless network including the access point and one or more terminals is described with reference to FIG. 3.

The access point may transmit a frame to a terminal, or may buffer the frame during a TXOP. Accordingly, the access point may determine an operation of the access point by receiving information associated with a current operation state of the terminal through association with the terminal.

In 310, the access point transmits, to one or more terminals, information about whether the access point is capable of supporting the power saving mode and information associated with a support capability of the access point for the power saving mode.

For example, the access point may notify the terminal about whether the access point is capable of supporting the power saving mode and the support capability of the access point, using an information element or a capability element of a probe response frame or a beacon frame. In this example, whether the access point is capable of supporting the power saving mode may correspond to whether the access point is capable of performing association with a terminal operating in the power saving mode.

A method of indicating the support capability of the access point for the power saving mode is further described with reference to FIG. 12. In 320, the access point transmits information associated with the TXOP duration to the terminals. For example, the TXOP duration may correspond to a time duration in which the access point obtaining a TXOP with respect to the channel may transmit at least one frame including data streams to one or more terminals.

The terminals may be made aware of information associated with the TXOP duration before entering the sleep state. For example, the terminals may be informed about an amount of remaining time for the TXOP, and the access point may transmit corresponding information to the terminals.

The terminals may be made aware of information about whether an additional data stream corresponding to each of the terminals, that is, whether there is an additional data stream to be transmitted to each of the terminals during the TXOP. Accordingly, the access point may provide, to the terminals, information about whether there is an additional data stream to be transmitted to each of the terminals during the TXOP, using information used to determine the operation state.

In response to at least one terminal setting the power management mode to the power saving mode during the TXOP, the access point may transmit information to be used by the at least one terminal to determine the operation state of the terminal in the power saving mode, in 330. The operation state in the power saving mode may correspond to one of an awake state and a sleep state or doze state.

Information used when each of the at least one terminal determines the operation state in the power saving mode as one of the awake state and the sleep state may include at least one of an ID of a group including each of the terminals, information indicating whether there is a data stream to be transmitted to each of the terminals from the access point during the TXOP, and information indicating whether there is an additional data stream to be transmitted to the terminals during the TXOP.

For example, whether there is a data stream to be transmitted to each of the terminals from the access point during the TXOP may be verified from an $N_{STS}$ field included in a VHT-SIG-A field.

As another example, whether there is an additional data stream to be transmitted to each of the terminals during the TXOP may be verified from an MDB of a control field.

In 340, the access point simultaneously transmits data streams to one or more terminals during the TXOP duration based on an operation state of each of the terminals.

For example, in 340, the access point may simultaneously transmit data streams to terminals in the awake state from among the terminals during the TXOP. For example, if a data stream is to be transmitted to a terminal that is in the sleep state during the remaining time of the TXOP duration, the access point may buffer the data stream to be transmitted.

In this example, 'simultaneously' transmitting the data streams may indicate that the data streams are simultaneously transmitted in a spatial aspect or are transmitted using an MU-MIMO) communication, and may not indicate that transmission of data streams corresponding to at least one terminal simultaneously starts and is simultaneously completed.

For example, the access point may not transmit a data stream corresponding to a terminal satisfying a predetermined criterion, so that the terminal satisfying the predetermined criterion may maintain the operation state as the sleep state for the remainder of the TXOP.

Whether the terminal satisfies the predetermined criterion may be determined based on information used to determine the operation state.

The predetermined criterion may include a first criterion, a second criterion, and a third criterion as described herein. Descriptions related thereto may refer to the descriptions described above with reference to FIGS. 1-3.

In response to an operation state of a terminal being changed from the sleep state to the awake state, the access point may transmit the buffered data stream to the terminal. In this example, if the TXOP duration ends, the access point may automatically recognize that the operation state of the corresponding terminal is changed from the sleep state to the awake state. As another example, the terminal may transmit a power save-poll message to the access point to inform the access point that the terminal is in the awake mode.

The power save-poll message may be a message that the terminal in the sleep state transmits in order to notify the access point of that the operation state of the terminal is changed from the sleep state to the awake state.

For example, when the terminal desires to operate in the power saving mode, the terminal may transmit, to the AP, a frame in which a power management mode is set to the power saving mode. The AP may transmit an ACK to the terminal in response to the frame.

In response, the AP transmits, to the terminal, information about the TXOP such as the Group ID, whether there is a data stream for the terminal, and whether there is an additional data stream for the terminal. The terminal may determine whether the predetermined criterion is satisfied based on the information. In this example, because the information is transmitted from the AP, the AP also may know whether the predetermined criterion is satisfied for each respective terminal.

Accordingly, even if the terminal does not transmit additional information that the terminal is going to enter into the sleep state, the AP may recognize that the terminal is going to enter into the sleep state.

In a MU-MIMO 802.11 network, the access point may group, into a single group or a plurality of groups, one or more terminals to which the access point may simultaneously transmit data. The access point may configure the single group or the plurality of groups with respect to the terminals based on a predetermined criterion, for example, a quality of service (QoS) requirement, a channel condition, and the like. The access point may notify the terminals of information associated with members of a group.

The access point may notify the terminals of information associated with members of the group using, for example, a management frame. A group having a predetermined group ID may include a set of terminals included in a corresponding cell.

The access point may assign a group ID independently from a TXOP transmission, that is, a transmission of a data frame between TXOP durations, instead of in the TXOP duration.

In response to a predetermined terminal entering the sleep state of the power saving mode, the access point may replace the predetermined terminal from the group with another terminal corresponding to data to be transmitted. In response, the access point may notify the terminals of information associated with the new member, that is, another terminal of the group that is updated by the replacement.

In response to the predetermined terminal notifying that the predetermined terminal enters the power saving mode, the access point may regroup the terminals and the predetermined terminal.

The aforementioned regrouping may be used when the predetermined terminal operates in the power saving mode for at least one TXOP.

The regrouping may enable the access point to transmit data to another terminal rather than to transmit a packet or a frame to a terminal that the access point does not have data to transmit to.

For example, in response to the TXOP duration being truncated or shortened, the access point may buffer a frame for terminals entering the power saving mode for an amount of remaining time of the duration of the TXOP.

Table 1 illustrates examples of bits used for a control field and an information element for power saving according to various aspects.

TABLE 1

| | Entity | number of bits | Description |
|---|---|---|---|
| 1 | Information element of information element field of beacon frame | 1 | '0': may be used to indicate that access point does not support power saving mode. '1': may be used to indicate that the access point supports power saving mode. |
| 2 | Information element of capabilities/support field of association request frame | 1 | '0': may be used to indicate that terminal does not support power saving mode. '1': may be used to indicate that terminal supports power saving mode. |
| 3 | Control field of MAC header | 1 | '0': may be used to indicate that power management mode is not set to power saving mode. '1': may be used to indicate that power management mode is set to power saving mode. |

In Table 1, the power saving mode may indicate a downlink MU TXOP power saving mode. It should be appreciated that the values such as '0' and '1' shown in Table 1 are merely for purposes of example, and other values may be used to perform the same notifications. For example, '1' may be used to indicate that access point does not support power saving mode.

Figure 4:
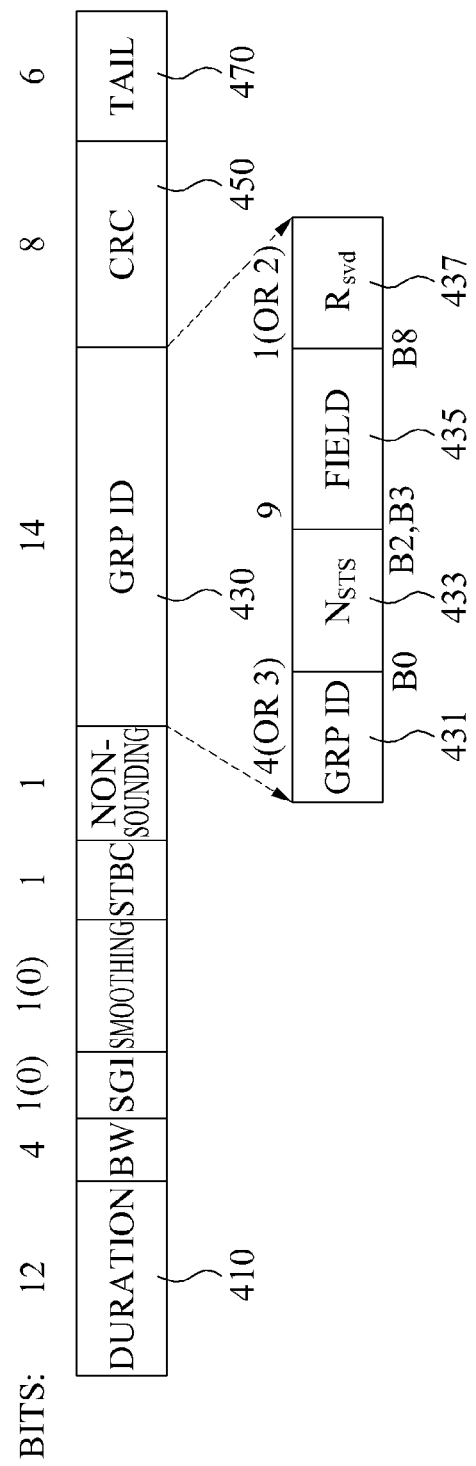
FIG. 4 is a diagram illustrating an example of a very high throughput signal (VHT-SIG) A field of an Institute of Electrical and Electronics Engineers (IEEE) 802.11 preamble.

FIG. 4 illustrates an example of a very high throughput signal (VHT-SIG) A field of an Institute of Electrical and Electronics Engineers (IEEE) 802.11 preamble.

Referring to FIG. 4, a duration field 410 may include 12 bits, and may include information associated with a TXOP duration, for example, a length of a TXOP duration and the like.

A group ID field 430 may include 14 bits, and may include group ID bits 431, $N_{STS}$ fields 433 and 435, and $R_{svd}$ bits 437.

For example, the group ID bits 431 may include three bits, four bits, and the like, and may notify each of terminals of a group ID that identifies each of the terminals in the group.

For example, the $N_{STS}$ fields 433 and 435 may include nine bits, and may be used to verify whether a data stream is to be transmitted to the terminals during a TXOP.

The $N_{STS}$ field 433 including lower three bits may indicate a number of space time streams to be transmitted to terminals included as members of the group in a corresponding frame. When a terminal k is not a receiver of an MU-MIMO packet or a frame, the $N_{STS}$ field 433 may be expressed by $N_{STS\_k}$='0' with respect to the terminal k.

For example, it may be assumed that a group ID of a corresponding group is '1' and terminals A, B, C, and D are included in the corresponding group. When $N_{STS}$=(0, 2, 3, 1), it may indicate that, in a corresponding frame, zero space time streams are going to be transmitted to the terminal A, two space time streams are to be transmitted to the terminal B, three space time streams are to be transmitted to the terminal C, and a single space time stream is to be transmitted to the terminal D. In this example, $N_{STS}$=(0, 2, 3, 1) indicates that the corresponding frame is transmitted to the terminals B, C, and D that are members of the group having the group ID '1'.

The $N_{STS}$ field 435 including upper six bits may be reused when the group ID is '0'. The $N_{STS}$ field 435 may be used for power saving. An example of the $N_{STS}$ field 435 used for the power saving mode is further described with reference to FIG. 14.

The $R_{svd}$ bits 437 may include a single bit. For example, if the $R_{svd}$ bits 437 is '1' and values of the $N_{STS}$ fields 433 and 435 are '0', it may indicate that data is absent in a data frame for a predetermined terminal included in a predetermined group. That is, it may indicate 'no data', and may indicate no more data for a terminal for the remaining amount of time in the TXOP duration.

A cyclic redundancy check (CRC) field 450 may include eight bits, and may be used for an error detection to verify a reliability with respect to data of a corresponding frame.

A tail field 470 may include six bits, and may be added to an end of the corresponding frame.

Figure 5:
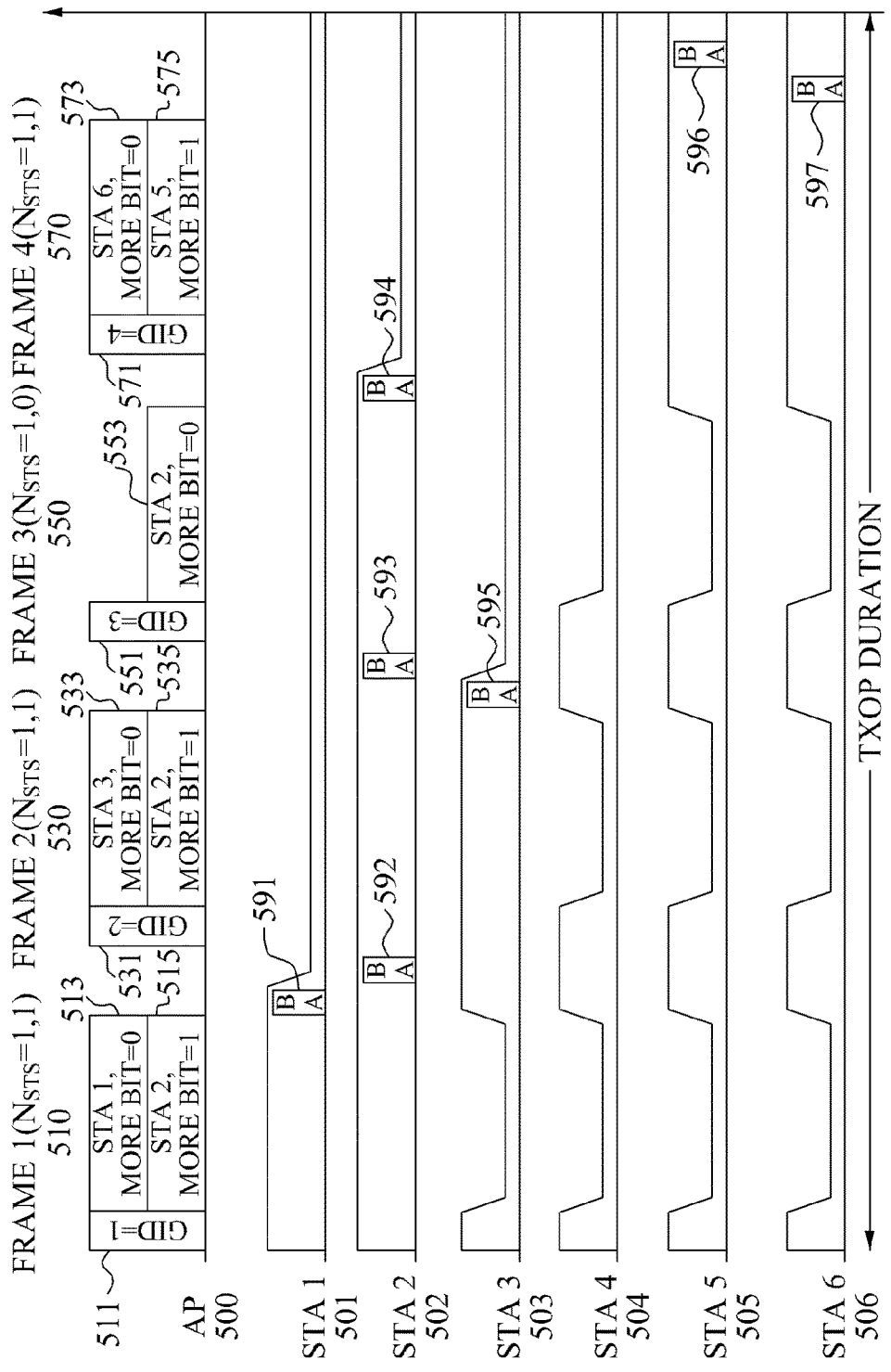
FIG. 5 is a diagram illustrating an example of an operation of each terminal based on a power saving mode and a group identifier (ID) of a group changed during a TXOP.

FIG. 5 illustrates an example of an operation of a plurality of terminals based on a power saving mode and a group ID of a group changed during a TXOP.

In this example, STA may indicate, for example, a terminal, or a station, and AP may indicate, for example, an access point.

Referring to FIG. 5, an STA (1) 501, an STA (2) 502, an STA (3) 503, and an STA (4) 504 have a power management mode of '1' (i.e. TXOP PS mode 140 shown in FIG. 1), and an STA (5) 505 and an STA (6) 506 have a power management mode of '0' (i.e. non-TXOP PS mode 130 shown in FIG. 1). As described above with reference to Table. 1, when the power management mode is '1', it may indicate that a corresponding terminal operates in the power saving mode. When the power saving mode is '0', it may indicate that the corresponding terminal operates in a mode excluding the power saving mode.

Table 2 shows group IDs of frames to be transmitted from an AP 500 to the terminals during the TXOP, and terminals that are members of a corresponding group. Table 2 shows information associated with a position of a corresponding terminal in a corresponding group.

TABLE 2

|  | Position 1 | Position 2 |
| --- | --- | --- |
| Group ID 1 | STA1, STA3, STA5 | STA2, STA4, STA6 |
| Group ID 2 | STA1, STA2 | STA3, STA4 |
| Group ID 3 | STA2, STA3 | STA4, STA5 |
| Group ID 4 | STA4, STA5 | STA6 |

Frame (1) 510 includes a group ID 511 of GID=1, a data field 513 with respect to the STA (1) 510 positioned in a position 1, and a data field 515 with respect to the STA (2) 502 positioned in a position 2. Referring to frame (1) 510, $N_{STS}$=1, 1 which in this example indicates that there is data to be transmitted to two terminals included in the group ID 511 of frame (1) 510.

The STA (1) 501 and the STA (2) 502 may receive data of frame (1) 510, and transmit block acknowledgements (BAs) 591 and 592 in response to frame (1) 510. In this example, referring to the data field 513 with respect to the STA (1) 501, more bit='0'. In this example, the STA (1) 501 operates in the power saving mode, and thus, may enter a sleep state after transmitting the BA 591 for the remainder of the TXOP. Referring to the data field 515 with respect to the STA (2) 502, more bit='1' and thus, STA (2) 502 remains in an awake state. In this example, 'more bit' corresponds to an MDB and the operation of the corresponding terminal based on the more bit may refer to descriptions made above with reference to the MDB.

Frame (2) 530 includes a group ID 531 of GID=2, a data field 535 with respect to the STA (2) 502 positioned in the position 1, and a data field 533 with respect to the STA (3) positioned in the position 2. Referring to frame (2) 530, $N_{STS}$=1, 1, which in this example indicates that there is data to be transmitted to two terminals included in the group ID 531 of frame (2) 530.

The STA (3) 503 and the STA (2) 502 may receive data of frame (2) 530, and transmit BAs 593 and 595 in response to frame (2) 530. Referring to the data field 533 with respect to the STA (3) 503, more bit='0'. In this example, the STA (3) 503 operates in the power saving mode, and thus, may enter the sleep state after transmitting the BA 595 for the remainder of the TXOP. Referring to the data field 535 with respect to the STA (2) 502, more bit='1' and thus, the STA (2) 502 remains in the awake state.

In this example, terminals, for example, the STA (4) 504, the STA (5) 505, and the STA (6) 506, that do not receive a frame during the TXOP duration may be in an on state between frame transmission durations in order to verify whether a corresponding frame is transmitted to a corresponding terminal.

Frame (3) 550 includes a group ID 551 of GID=3, and a data field 553 with respect to the STA (2) 502 positioned included in the position 1. Referring to frame (3) 550, $N_{STS}$=1, 0, which in this example indicates that there is data to be transmitted to a single terminal included in the group ID 551 of the frame (3) 550, and also indicates that data is not going to be transmitted to another terminal in the group ID 551. Referring to the data field 553 with respect to the STA (2) 502, more bit=0. As a result, the STA (2) 502 may receive the corresponding data and transmit a BA 594 to the AP 500 and then enter the sleep state for the remainder of the TXOP.

In this example, STA (4) 504 is positioned in the position 2 of the group ID 3. However, because $N_{STS}$=1, 0 in frame (3) 550, this indicates that no data is to be transmitted to the STA (4) 504. In this example, a second criterion is satisfied and the STA (4) 504 may enter sleep mode for the remainder of the TXOP. That is, the STA (4) 504 may enter the sleep state after receiving a preamble of frame (3) 550.

Frame (4) 570 includes a group ID 571 of GID=4, a data frame 575 with respect to the STA (5) 505 positioned in the position 1, and a data frame 573 with respect to the STA (6) 506 positioned in the position 2. Referring to the frame (4) 570, $N_{STS}$=1, 1, which in this example is used to indicate that there is data to be transmitted to two terminals included in the group ID 571 of the frame (4) 570.

The STA (5) 505 and the STA (6) 506 may receive data of the frame (4) 570, and transmit BAs 596 and 597 in response to the frame (4) 570. Referring to the data field 573 with respect to the STA (6) 506, more bit=0, however, the STA (6) 506 does not operate in the power saving mode. Accordingly, after transmitting the BA 597, the STA (6) 506 may still remain in the awake state.

Figure 6:
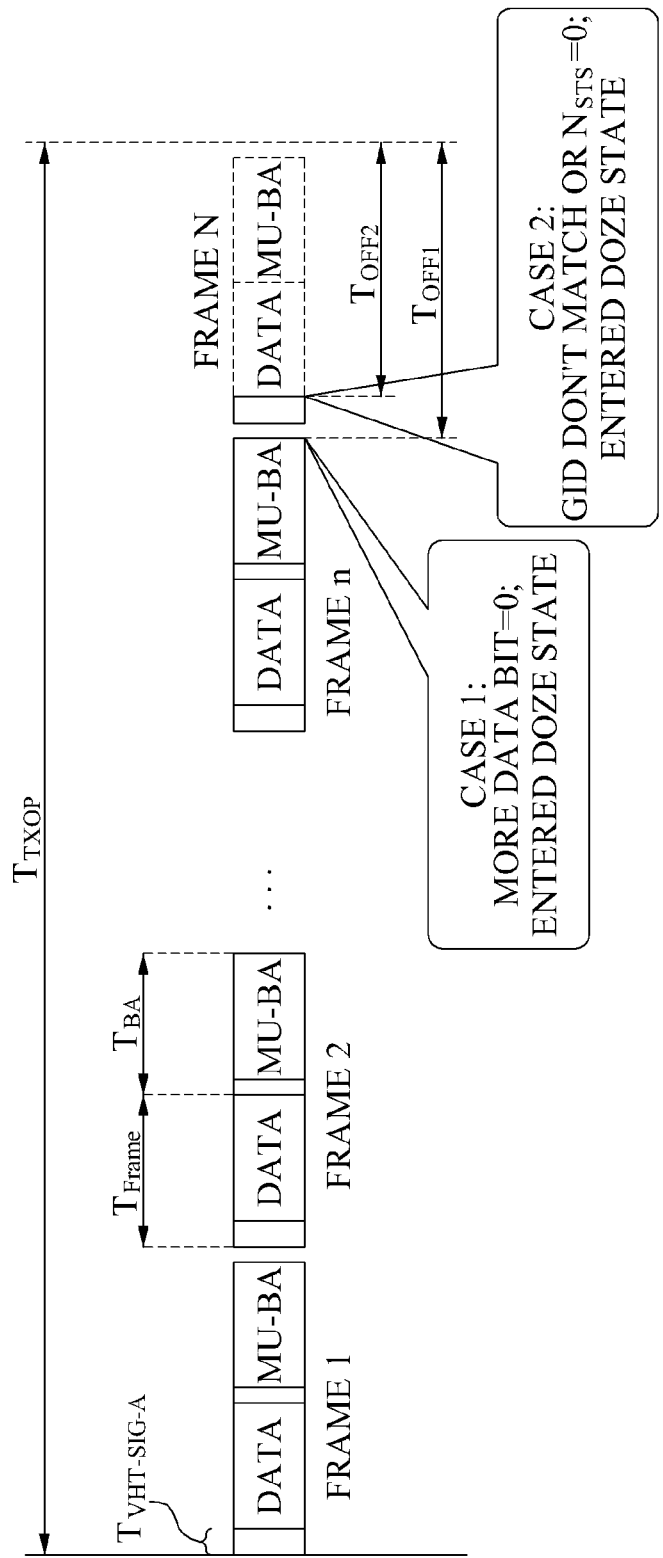
FIG. 6 is a diagram illustrating an example of a power saving rate when a predetermined criterion for power saving is satisfied.

FIG. 6 illustrates an example of a power saving rate when a predetermined criterion for power saving is satisfied.

Referring to FIG. 6, MU-BA may include a short interframe space (SIFS) and a BA from each of a plurality of terminals for each MU-BA phase. A single extra SIFS may be inserted between an end of the BA and a start of a subsequent frame.

$$\text{No. of frames}(N) \rightarrow N = \left\lfloor \frac{3.008 \text{ ms}}{T_{Frame} + T_{BA}} \right\rfloor \quad \text{[Equation 1]}$$

In Equation 1, N corresponds to a number of frames that have a unit size available in 3.008 ms. $T_{Frame}$ corresponds to a frame duration and may have a value of, for example, 0.5 ms, 1 ms, 1.5 ms, and the like. $T_{BA}$ corresponds to a duration of an uplink MU-BA phase. $T_{BA}$ may be expressed by 4*(28 μs+SIFS)+1*SIFS.

$$T_{TXOP} = N*(T_{Frame} + T_{BA}) \quad \text{[Equation 2]}$$

In Equation 2, $T_{TXOP}$ corresponds to the TXOP duration.

A power saving rate $PS_{TXOP}^{(1)}$ of a case in which the aforementioned third criterion is satisfied may be expressed by Equation 3. In the example of FIG. 6, the third criterion is satisfied in CASE 1.

$$PS_{TXOP}^{(1)} = \frac{T_{OFF1}}{T_{TXOP}} = \frac{T_{TXOP} - n*(T_{Frame} + T_{BA})}{T_{TXOP}} \quad \text{[Equation 3]}$$

In Equation 3, $T_{OFF}$ corresponds to a duration for a terminal in the power saving mode. In this example, 'n' may have values from '0' to N, and corresponds to a number of frames that are to be transmitted to the terminal.

A power saving rate $PS_{TXOP}^{(2)}$ of a case in which the aforementioned first criterion and second criterion are satisfied may be expressed by Equation 4. In this example, the first and second criterion are satisfied in CASE 2 of FIG. 6.

Equation 4 expresses a power saving rate when a group ID indicates that a corresponding terminal is not a member of a corresponding group, or when the group ID indicates that the corresponding terminal is a member of the corresponding group, however, there is no data stream to be transmitted to the corresponding terminal from an access point during the TXOP.

A case in which there is no data stream to be transmitted to the corresponding terminal during the TXOP may be a case in which the $N_{STS}$ included in a VHT-SIG-A field of a frame transmitted to the corresponding terminal is set to '0'.

$$PS_{TXOP}^{(2)} = \frac{T_{OFF2}}{T_{TXOP}} = \frac{T_{TXOP} - n*(T_{Frame} + T_{BA}) - T_{VHT\text{-}SIG\text{-}A}}{T_{TXOP}} \quad \text{[Equation 4]}$$

In Equation 4, $T_{VHT\text{-}SIG\text{-}A}$ corresponds to a time to decode VHT SIG-A=28 μs.

Figure 7:
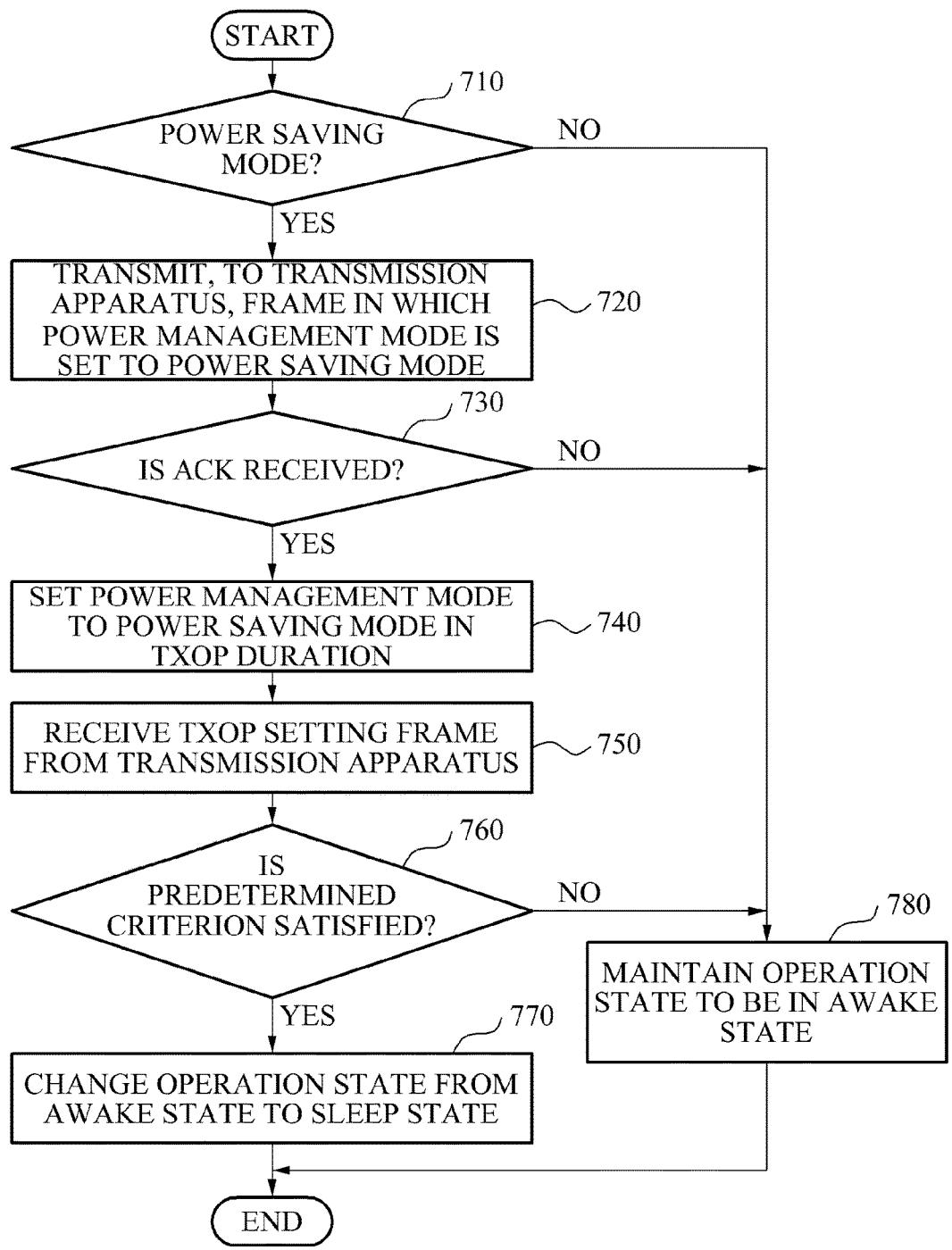
FIG. 7 is a flowchart illustrating another example of a communication method of a terminal.

FIG. 7 illustrates another example of a communication method of a terminal.

For example, the terminal may correspond to a terminal from among one or more terminals having a power management mode as an active mode. During a TXOP, streams corresponding to the terminals may be simultaneously transmitted from an access point.

In 710, the terminal determines to operate in a power saving mode. In response to determining to operate in the power saving mode, in 720 the terminal transmits, to the access point, a frame in which a power management mode is set to the power saving mode. By setting the power management mode to the power saving mode, the terminal indicates to the access point that the terminal desires to operate in power saving mode.

For example, the power management mode may be set to the power saving mode by setting a field or a bit indicating whether the power saving mode is used in a frame transmitted to the access point. For example, a capabilities/support field of an association request frame may be set to a value of '1'.

In response to determining that the terminal is not to operate in the power saving mode, for example, when the terminal determines to operate in the non-TXOP PS mode 130 of FIG. 1, the terminal may maintain the operation state as an awake state, in 780.

In 730, the terminal determines whether an ACK is received from the access point in response to the frame in which the power management mode is set to the power saving mode.

When the ACK is not received from the access point in 730, the terminal maintains the operation state as the awake state, in 780. For example, when the ACK is not received from the access point, the terminal may not operate in the power saving mode.

When the ACK is received from the access point, the terminal sets the power management mode to the power saving mode during the remainder of the TXOP, in 740.

In 750, the terminal receives, from the access point, a TXOP setting frame including information associated with the TXOP duration.

For example, the TXOP setting frame may be generated to be decodable by both a terminal having set the power management mode to the power saving mode, and a terminal having not set the power management mode to the power saving mode.

A period in which the terminal may receive the TXOP setting frame may not be limited by the aforementioned order, and thus, may be changed for a process of communicating with the access point.

In this example, the terminal may determine whether the terminal corresponds to a terminal that is to receive a corresponding data stream based on the TXOP setting frame received from the access point. Based on the determination result, the terminal may transmit, to the access point, a response frame with respect to the TXOP setting frame.

In 760, the terminal may determine whether a predetermined criterion is satisfied based on information transmitted from the access point. The terminal may determine the operation state of the terminal by determining whether the predetermined criterion is satisfied.

For example, information transmitted from the access point may include at least one of a group ID of a group including the terminal, information about whether a data stream corresponding to the terminal is to be transmitted from the access point during the TXOP, and information indicating whether there is an additional data stream to be transmitted to the terminal during the TXOP.

The predetermined criterion may include a first criterion, a second criterion, and a third criterion. When the terminal is not included in the group of the group ID including a set of terminals within a corresponding cell, the first criterion may be satisfied. When the terminal is included in the group of the group ID, but a data stream corresponding to the terminal is not to be transmitted from the access point during the TXOP, the second criterion may be satisfied. When an indicator indicating that there is no additional data stream to be transmitted to the terminal during the TXOP, the third criterion may be satisfied.

For example, the terminal may selectively determine whether to change the operation state of the terminal based on the first criterion and the second criterion, using an enabling bit included in each of frames transmitted from the access point.

In response to at least one of the predetermined criterion being satisfied in 760, the terminal changes the operation state of the terminal from the awake state to the sleep state, in 770. The terminal may save receive standby power and decrease power consumption for receiving data by maintaining the sleep state for the remainder of the TXOP.

Conversely, when the predetermined criterion is not satisfied, the terminal maintains the operation state of the terminal in the awake state, in 780.

Figure 8:
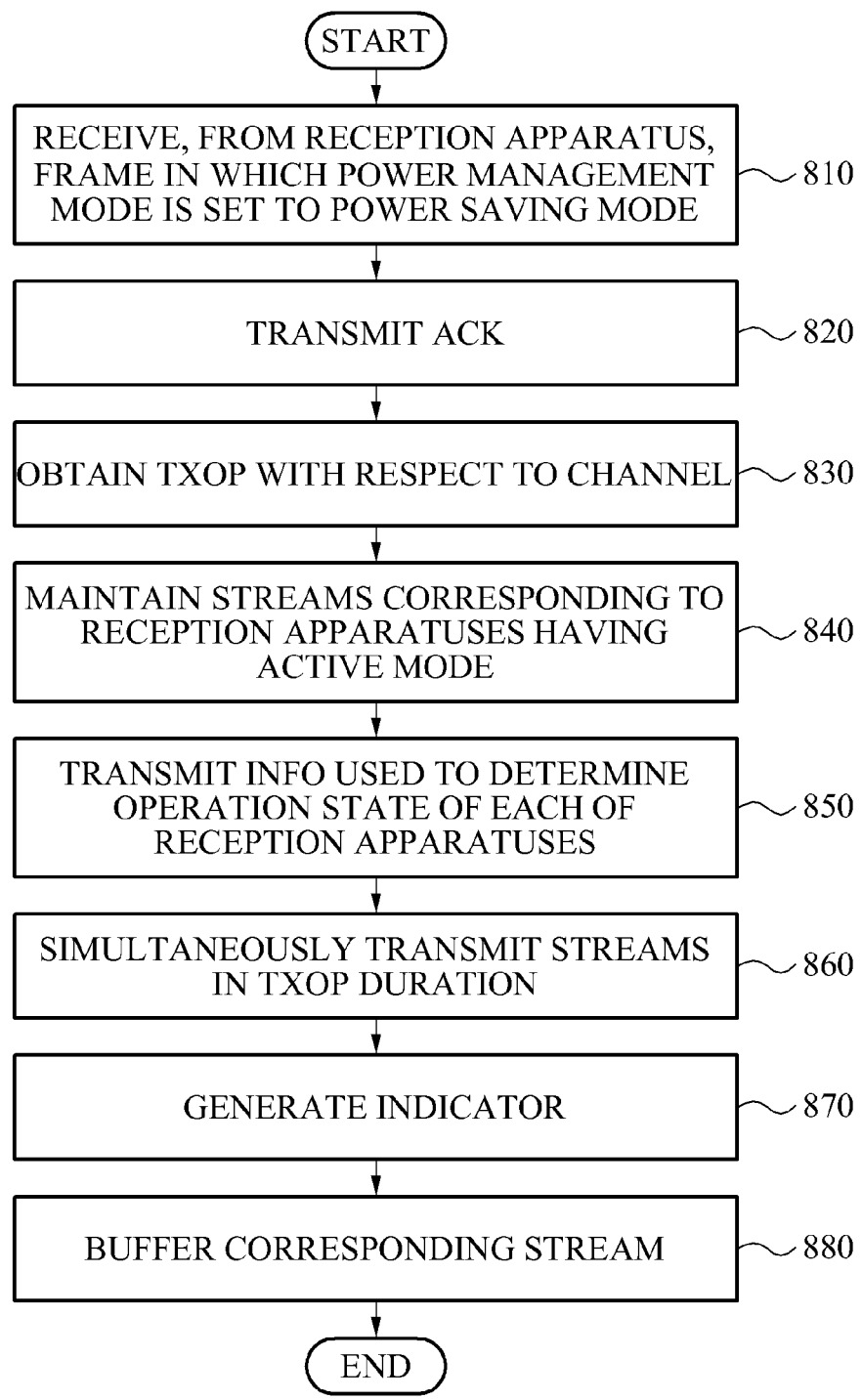
FIG. 8 is a flowchart illustrating another example of a communication method of an access point.

FIG. 8 illustrates another example of a communication method of an access point.

In 810, the access point receives a frame in which a power management mode is set to a power saving mode. The frame may be received from a terminal indicating the terminal is to operate in the power saving mode from among terminals having an active mode as the power management mode.

In 820, the access point transmits an ACK to the terminal in response to the frame in which the power management mode is set to the power saving mode.

In 830, the access point obtains a TXOP with respect to a channel.

In 840, the access point maintains data streams corresponding to terminals that have the active mode as a power management mode.

In 850, the access point transmits information that may be used by the terminals to determine an operation state of each of the terminals.

For example, the information that may be used by the terminals to determine the operation state of each of the terminals may include at least one of a group ID of a group including each of the terminals that the access point may transmit data streams to, information about whether a data stream corresponding to each of the terminals is transmitted from the access point during the TXOP duration, and information indicating whether there is an additional data stream to be transmitted to the terminals during the TXOP.

In 860, the access point transmits the data streams to at least one of the terminals during the TXOP. For example, if a plurality of terminals are in the awake mode, the access point may simultaneously transmit data streams to the plurality of terminals.

For example, 'simultaneously' transmitting the data streams may indicate that the data streams are simultaneously transmitted in a spatial aspect or are transmitted using a MU-MIMO communication, and may not indicate that transmission of data streams corresponding to at least one terminal simultaneously starts and is simultaneously completed.

The TXOP duration may correspond to a time duration corresponding to a TXOP with respect to the channel, and may correspond to a time duration in which the access point obtaining the TXOP with respect to the channel may transmit at least one frame including the data streams to the group including the terminals. For example, the TXOP duration may indicate the amount of time that an access point has to transmit data on a respective channel.

Based on information used to determine the operation state, the access point may not transmit a data stream to a terminal that is in a sleep state. For example, terminals satisfying a predetermined criterion may maintain an operation state in the sleep state for the remaining amount of the TXOP duration.

The information used to determine the operation state and the data streams may be included in the same frame. For example, the group of the group ID may include the set of terminals within the corresponding cell.

The access point may transmit a frame including an enabling bit that enables the terminal to selectively determine whether to change the operation state of the terminal based on the first criterion and/or the second criterion.

In 870, the access point generates an indicator indicating whether there is an additional data stream to be transmitted to the terminal during the TXOP.

For example, in 870, the access point generates the indicator indicating that there are no more additional data streams corresponding to the terminal that are to be transmitted during the TXOP using a preamble of a packet transmitted to the terminal or a header of a MAC frame transmitted to the terminal. For example, the indicator may be an MDB of the MAC header.

In 880, the access point buffers a data stream that is to be transmitted to a terminal in the sleep state for the remainder of the TXOP duration. For example, a TXOP may be cut short for various unforeseen reasons, and the terminal may still be in a sleep state for the remainder of the TXOP which was cut short. Therefore, the access point may buffer data that is to be sent to the terminal.

Figure 9:
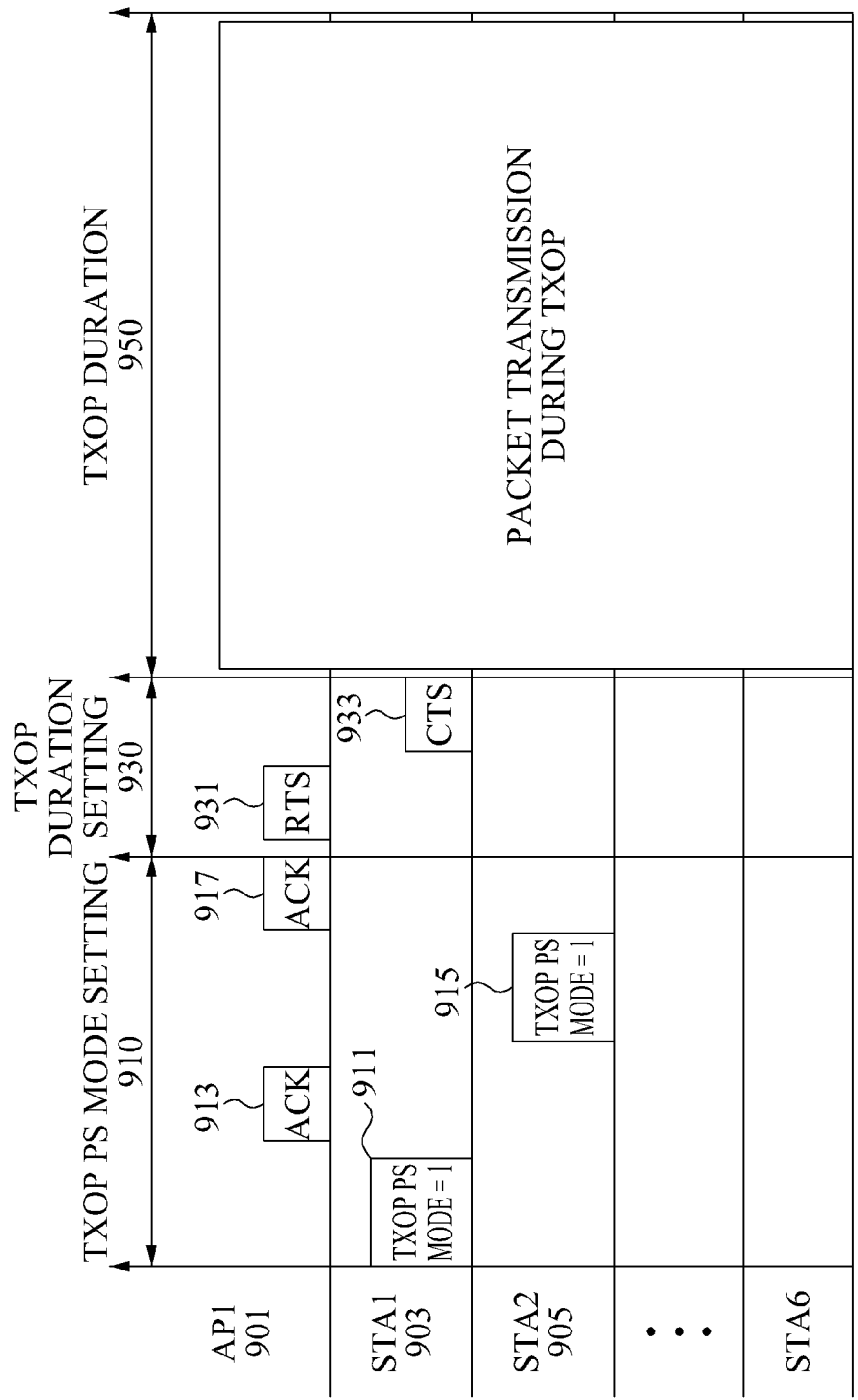
FIG. 9 is a diagram illustrating an example of a terminal setting a power management mode to a power saving mode.

FIG. 9 illustrates an example of a terminal setting a power management mode to a power saving mode.

A STA may indicate, for example, a terminal, or a station, and AP may indicate, for example, an access point.

STA (1) 903 desiring to operate in a power saving mode may transmit, to an AP (1) 901, a frame 911 in which a power saving mode, that is, a TXOP PS mode, is set to '1'. In this example, setting of the power saving mode to '1' may indicate that a corresponding STA sets the power management mode of the corresponding STA to the power saving mode. The corresponding STA may use, for example, a capabilities/support field of an association request frame to set the power management mode of the STA to indicate that the STA desires to operate in power saving mode. The STA (1) 903 may receive an ACK 913 from the AP (1) 901 as a response to the frame 911.

After receiving the ACK 913, the STA (1) 903 may operate in the power saving mode.

Similarly, an STA (2) 905 may transmit, to the AP (1) 901, a frame 915 in which the power saving mode is set to '1', and may operate in the power saving mode after receiving an ACK 917 from the AP (1) 901.

The STA (1) 903 and the STA (2) 905 may be set to operate in the power saving mode by performing the aforementioned operation as the AP (1) 901 in a TXOP PS mode setting period 910.

In a TXOP duration setting period 930, the AP (1) 901, the STA (1) 903, and the STA (2) 905 may set a TXOP duration 950 using a request to send (RTS) frame 931 and a clear to send (CTS) frame 933.

The TXOP duration setting period 930 may correspond to a TXOP setting period which is further described later.

The RTS frame 931 and the CTS frame 933 may be used to prevent a frame collision known as a hidden node issue. A process may be initiated by transmitting, by a node, for example, the AP (1) 901 desiring to transmit data, the RTS frame 931. In the case of a wireless environment in which a transmission is possible because other signals being are not being transmitted, the STA (1) 903 corresponding to a destination node may transmit the CTS frame 933 as a response to the signal. The other nodes receiving the RTS frame 931 or the CTS frame 933 may solve the hidden node issue by limiting a data transmission for a predetermined amount of time. The predetermined amount of time may be included in the RTS frame 931 and the CTS frame 933.

Figure 10:
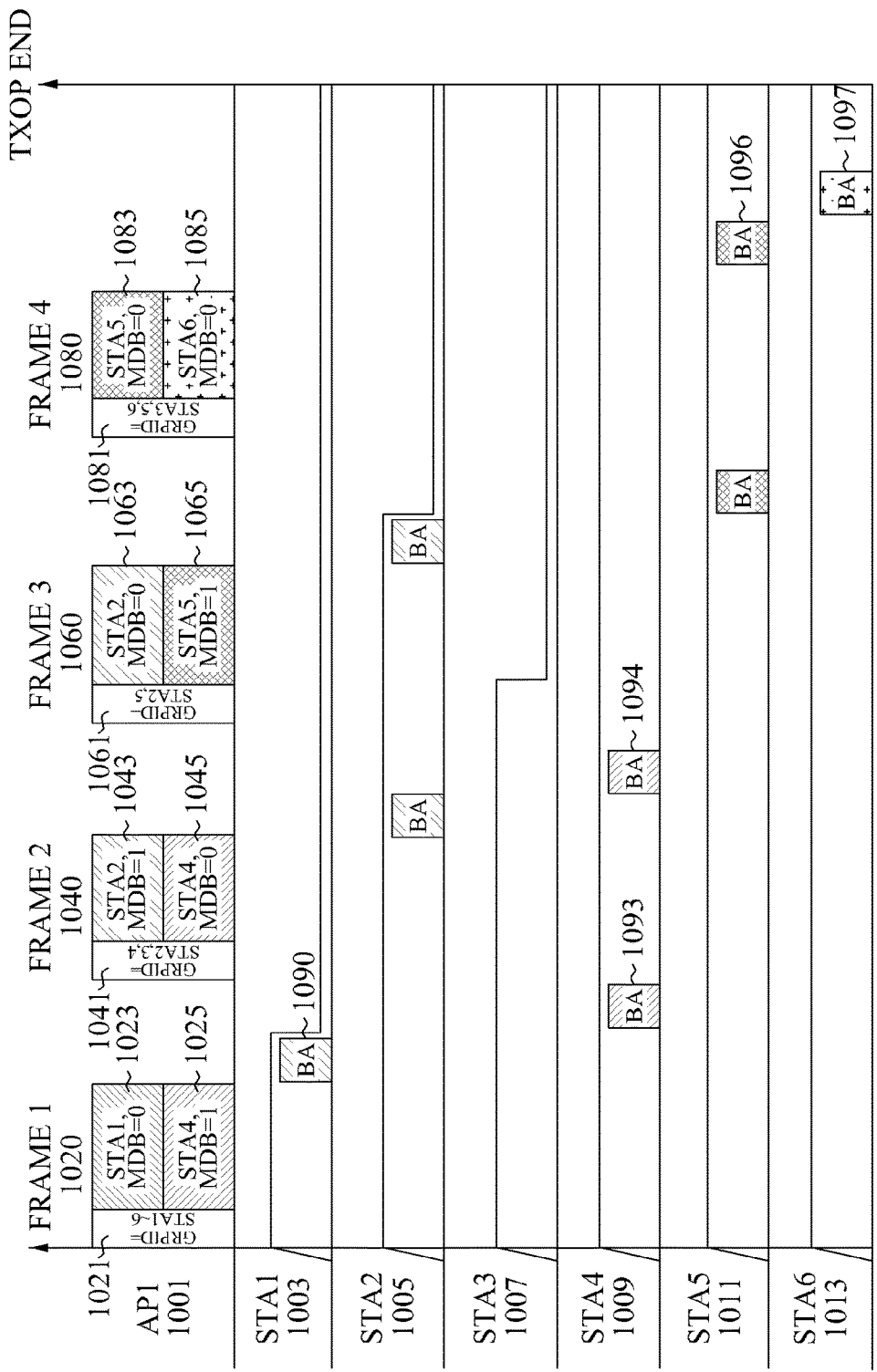
FIG. 10 is a diagram illustrating an example of a frame transmitted and received during a TXOP.

FIG. 10 illustrates an example of a frame transmitted and received during a TXOP. In this example, the second criterion is not considered.

Referring to FIG. 10, an AP (1) 1001 and six STAs, for example, an STA (1) 1003, an STA (2) 1005, an STA (3) 1007, an STA (4) 1009, an STA (5) 1011, and an STA (6) 1013 are present within a single cell or a basic service set (BSS), and the six STAs are shown in Table 3.

TABLE 3

|  | Apparatuses using TXOP PS mode | Apparatuses using non-TXOP PS mode |
| --- | --- | --- |
| Data in buffer | STA 1, STA 2 | STA 4, STA 5, STA 6 |
| No data | STA 3 | N/A |

Referring to Table 3, among the six STAs, the STA (1) 1003, the STA (2) 1005, and the STA (3) 1007 correspond to terminals in a power saving mode, that is, a TXOP PS mode 140 illustrated in FIG. 1.

In this example, the AP (1) 1001 has data to transmit to the STA (1) 1003, the STA (2) 1005, the STA (4) 1009, the STA (5) 1011, and the STA (6) 1013.

Referring to FIG. 10, Frame (1) 1020 includes all the stations, that is, the STA (1) 1003, the STA (2) 1005, the STA (3) 1007, the STA (4) 1009, the STA (5) 1011, and the STA (6) 1013, in a group of a group ID included in a preamble 1021. Accordingly, after receiving Frame (1) 1020, the first criterion is not satisfied for any of the STAs.

Frame (1) 1020 includes data 1023 to be transmitted to the STA (1) 1003, and data 1025 to be transmitted to the STA (4) 1009, and an MDB of the STA (1) 1003 is set to '0'.

The MDB of the STA (1) 1003 is set to '0' which in this example indicates that there is no more data to be additionally transmitted from the AP (1) 1001 to the STA (1) 1003. Thus, the third criterion is satisfied for STA (1) 103. Accordingly, the STA (1) 1003 may transmit a block acknowledgement (BA) 1090 to the AP (1) 1001 and then operate in the power saving mode until the end of the TXOP, thereby reducing standby power consumption. An example of the power saving state is a sleep state or a doze state.

After completing reception of a corresponding data stream based on the MDB, or after transmitting the BA 1090 with respect to the corresponding data stream, the STA (1) 1003 may maintain the operation state of the STA (1) 1003 in a sleep state for the remaining time of the TXOP duration.

Frame (2) 1040 includes the STA (2) 1005, the STA (3) 1007, and the STA (4) 1009 in a group of a group ID included in a preamble 1041, and includes data 1043 to be transmitted to the STA (2) 1005 and data 1045 to be transmitted to the STA (4) 1009.

The STA (3) 1007 in the power saving mode, that is, the TXOP PS mode does not have data to receive from the AP (1) 1001, however, is included in the group ID. Accordingly, the STA (3) 1007 may not enter the sleep state. That is, in the example of FIG. 10, the STAs do not consider the second criterion, but only consider the first and third criterion.

In frame (2) 1040, an MDB of the STA (2) 1005 is set to '1' and thus, STA (2) 1005 may remain in an awake state.

In frame (2) 1040, an MDB of the STA (4) 1009 is set to '0', however, STA (4) 1009 is in non-TXOP PS mode and does not use the power saving mode. Accordingly, even after transmitting, to the AP (1) 1001, BAs 1093 and 1094 in response to the frame (1) 1020 and the frame (2) 1040, the STA (4) 1009 may remain in the awake state instead of saving power.

Frame (3) 1060 includes the STA (2) 1005 and the STA (5) 1011 in a group of a group ID included in a preamble 1061, and includes data 1063 to be transmitted to the STA (2) 1005 and data 1065 to be transmitted to the STA (5) 1011.

The STA (3) 1007 operating in the power saving mode is not included in a group of a group ID of a frame (4) 1080, and therefore, the first criterion is satisfied for the STA (3) 1007. Thus, the STA (3) 1007 may enter into a power saving mode for the remainder of the TXOP.

In the example of FIG. 10, operating in the power saving state may indicate remaining in the sleep state.

In frame (3) 1060, the MDB of the STA (2) 1005 is set to '0', and thus, the STA (2) may enter into a power saving state such as a sleep state for the remainder of the TXOP duration after receiving data.

Frame (4) 1080 includes the STA (5) 1011 and the STA (6) 1013 in a group of a group ID included in a preamble 1081, and includes data 1083 to be transmitted to the STA (5) 1011 and data 1085 to be transmitted to the STA (6) 1013. Even though frame (4) 1080 includes the STA (3) 1007, the STA (3) 1007 is already in the sleep state. Accordingly, the STA (3) 1007 may continuously maintain the sleep state during the TXOP duration.

The STA (5) 1011 and the STA (6) 1013 may receive frame (4) 1080 and may transmit BAs 1096 and 1097 to the AP (1) 1001.

The AP (1) 1001 may include any STAs in a group of a group ID of a frame to be transmitted. However, STAs that are in the sleep state may not receive a corresponding frame. Accordingly, the AP (1) 1001 may buffer data to be transmitted while a corresponding STA is in the sleep state.

Figure 11:
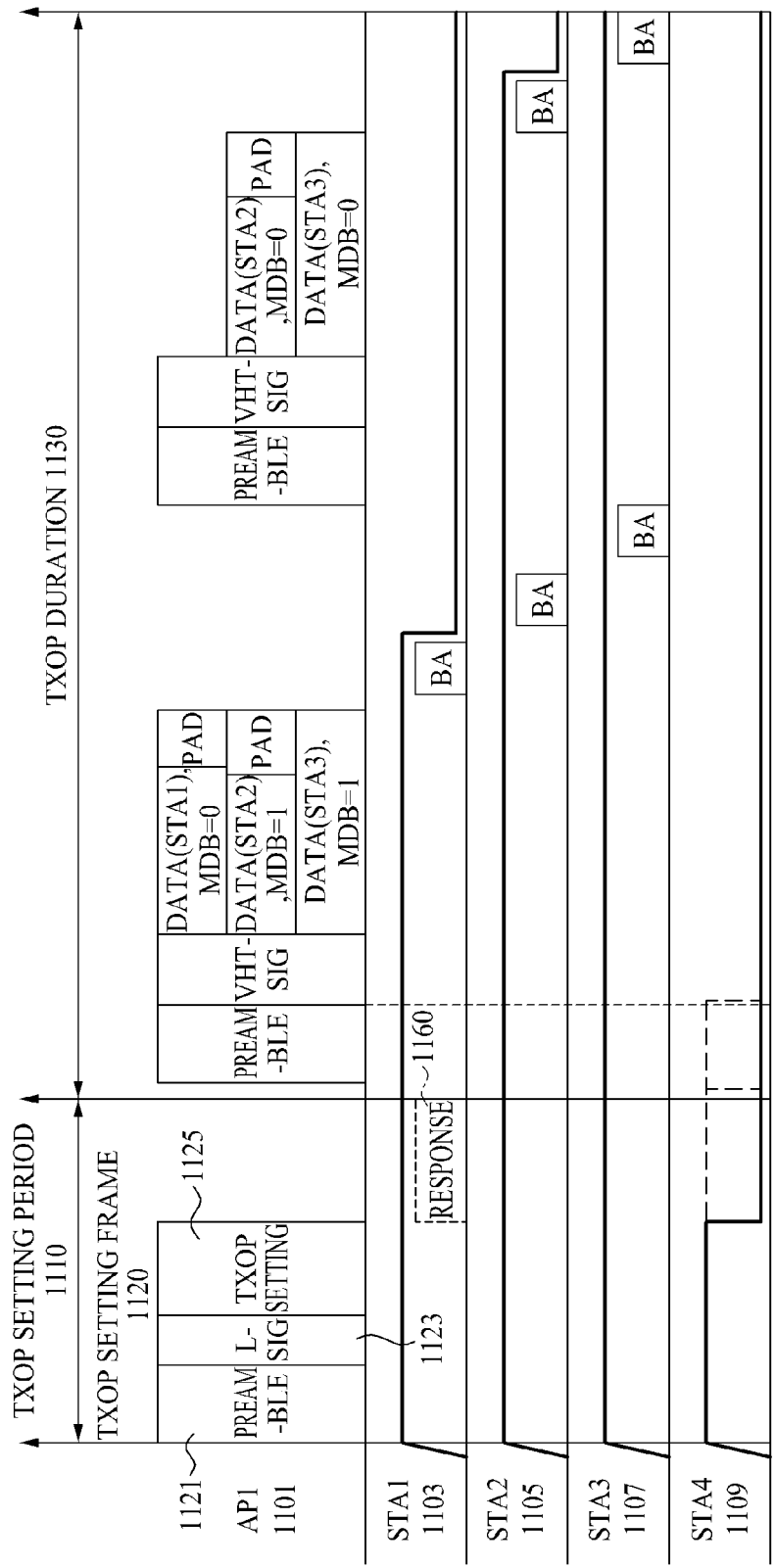
FIG. 11 is a diagram illustrating an example of a TXOP setting frame and a TXOP duration.

FIG. 11 illustrates an example of a TXOP setting frame and a TXOP duration.

Referring to FIG. 11, an AP (1) 1101 may set a time duration corresponding to a TXOP with respect to a channel. For example, the AP (1) 1101 may set a TXOP duration 1130 by transmitting a TXOP setting frame 1120 in a TXOP setting period 1110.

The TXOP setting frame 1120 may include information used to set the time duration corresponding to the TXOP duration 1130. The TXOP setting frame 1120 may be transmitted in a form that may be overheard by all the STAs within a cell or a BSS. For example, the STAs may include terminals having set a power management mode to a power saving mode such as a sleep state, and terminals having not set the power management mode to the power saving mode such as an awake state.

For example, a multi-user precoding scheme and the like may not be applied to the TXOP setting frame 1120. The TXOP setting frame 1120 may be generated to be decodable by all the STAs within the cell even those STAs that are in a sleep state.

The TXOP setting frame 1120 may include information about whether to apply the power saving mode, or a target reception group that is a transmission target of a frame during the corresponding TXOP duration 1130. Information associated with the target reception group may include a predetermined group that has the same group ID and STAs belonging to the predetermined group.

When the TXOP setting frame 1120 includes information associated with the target reception group, STAs excluded from a corresponding reception group may maintain the sleep state by the end of the TXOP duration 1130 after receiving the TXOP setting frame 1120.

A single STA or STAs belonging to the target reception group may transmit a response frame 1160 with respect to the TXOP setting frame 1120. For example, the response frame 1160 may include a portion of or all of descriptions included in the TXOP setting frame 1120.

Accordingly, hidden nodes not receiving the TXOP setting frame 1120 may set a TXOP. When at least one STA transmits the response frame 1160, the at least one STA may transmit the response frame 1160 according to a predetermined order and a predetermined method. Otherwise, corresponding information may be included in the TXOP setting frame 1120.

The TXOP setting period 1110 may be used to set the time duration corresponding to the TXOP with respect to the channel, for example, the TXOP duration 1130.

As an example, in the TXOP setting period 1110 for setting the TXOP duration 1130, the AP (1) 1101 may transmit the TXOP setting frame 1120 to an STA (1) 1103, an STA (2) 1105, an STA (3) 1107, and an STA (4) 1109 within a cell.

The TXOP setting frame 1120 may be used for a corresponding terminal to receive a corresponding data stream in the TXOP duration 1130, or to operate in the power saving mode.

For example, the TXOP setting frame 1120 may include a preamble 1121, a legacy signal field (L-SIG) 1123, and TXOP setting information 1125 for setting the TXOP duration 1130.

Each of the STA (1) 1103, the STA (2) 1105, the STA (3) 1107, and the STA (4) 1109 may set the time duration corresponding to the TXOP with respect to the channel, based on the TXOP setting information 1125.

In this example, each of the STA (1) 1103, the STA (2) 1105, and the STA (3) 1107 are to receive data from the AP (1) 1101 and may access a radio channel in the TXOP (1) 1101 duration 1130 to receive a packet or a frame from the AP (1) 1101.

However, the STA (4) 1109 is not to receive data from the AP (1) 1101 and may not access the radio channel in the TXOP duration 1130.

The TXOP setting information 1125 may include information associated with a group of STAs to receive the data from the AP (1) 1101 among the STA (1) 1103, the STA (2) 1105, the STA (3) 1107, and the STA (4) 1109.

Each of the STA (1) 1103, the STA (2) 1105, the STA (3) 1107, and the STA (4) 1109 may set the TXOP duration 1130 based on the TXOP setting information 1125. In the TXOP duration 1130, data transmission may be performed between the AP (1) 1101 and each of the STA (1) 1103, the STA (2) 1105, the STA (3) 1107, and the STA (4) 1109 using a method similar to the method described above with reference to FIG. 5.

The STA (1) 1103 to receive data from the AP (1) 1101 may transmit, to the AP (1) 1101, the response frame 1160 with respect to the TXOP setting information 1125. The response frame 1160 with respect to the TXOP setting information 1125 may prevent entangling of the STA (1) 1103, the STA (2) 1105, the STA (3) 1107, and the STA (4) 1109 when coverages of a plurality of APs are overlapped with each other.

Figure 12:
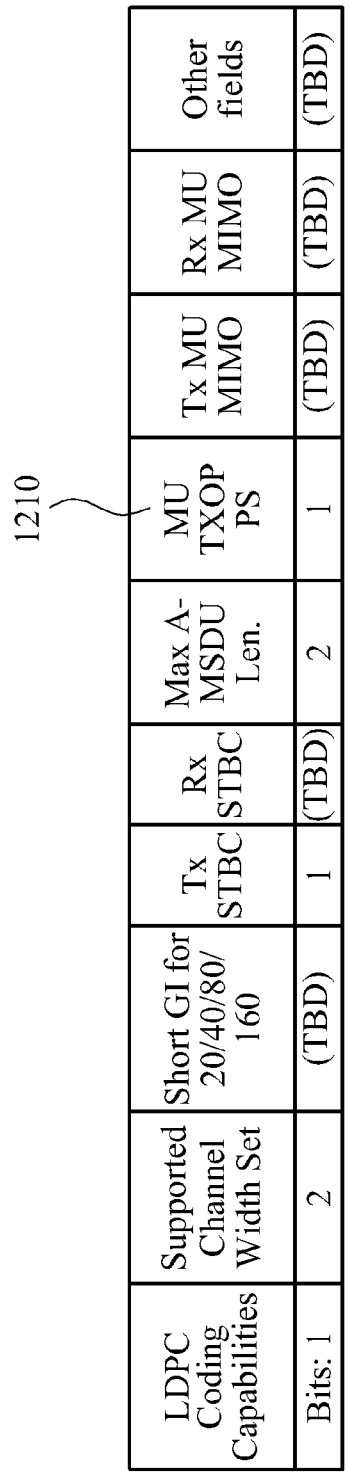
FIG. 12 is a diagram illustrating an example of a VHT capabilities element that may be used by an access point to express the access point's power saving support capability.

FIG. 12 illustrates an example of a VHT capabilities element that may be used by an access point to express the access point's power saving support capability. It should be appreciated that the terminal may also use the VHT capabilities element to express the terminal's power saving support capability. For example, the VHT capability information element may be included in an association request frame or an association response frame based on the IEEE 802.11 standard.

Referring to FIG. 12, the access point may express a support capability of the access point for a power saving mode using VHT capabilities information field of a VHT capabilities element.

For example, if a MU TXOP PS field 1210 is set to '0', it may indicate that the access point does not have the power saving support capability with respect to a corresponding terminal. As another example, if the MU TXOP PS field 1210 is set to '1', it may indicate that the access point has the power saving support capability with respect to the corresponding terminal.

Figure 13:
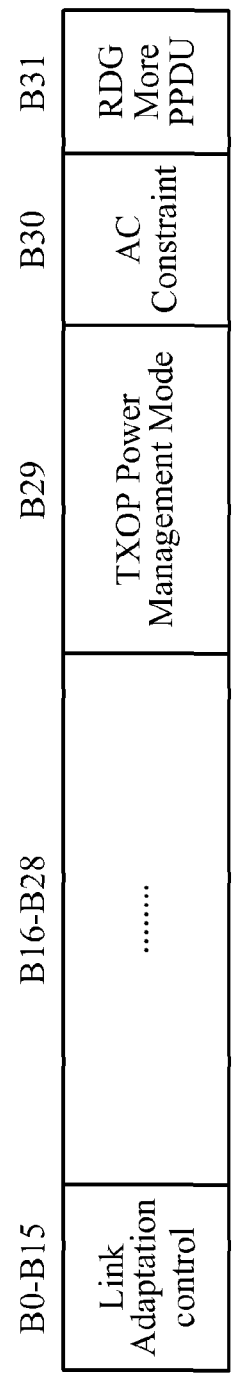
FIG. 13 is a diagram illustrating an example of a VHT control field of a MAC header that may be used by a terminal to notify an access point of a power management mode of the terminal.

FIG. 13 illustrates an example of a VHT control field of a MAC header that may be used by a terminal to notify an access point of a power management mode of the terminal.

As described above with reference to FIG. 1, the terminal may operate in the power management mode such as an active mode corresponding to one of a non-TXOP PS mode 130, and a TXOP PS mode 140. Accordingly, the terminal may notify the access point of the power management of the access point using B29 of a VHT control field. The terminal may also operate in the power saving mode 120. Accordingly, the terminal may use one or more bits of the VHT control field to notify the access point that the terminal is in power saving mode 120.

When B29 of the VHT control field is set to '0', it may indicate that the power management mode of the terminal corresponds to the non-TXOP PS mode. When B29 of the VHT control field is set to '1', it may indicate that the power management mode of the terminal corresponds to the TXOP PS mode.

Figure 14:
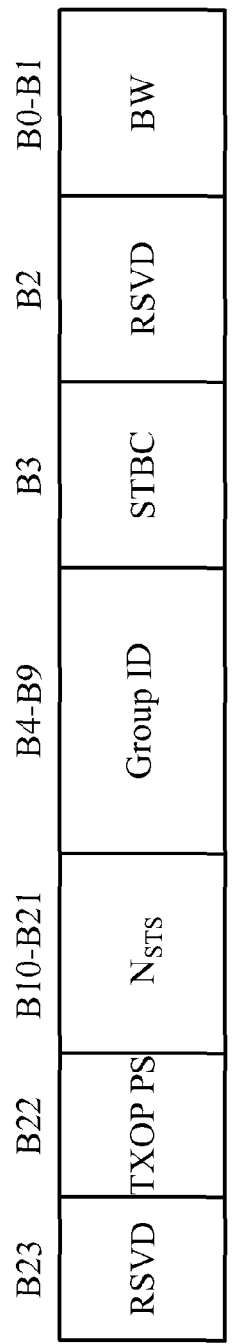
FIG. 14 is a diagram illustrating an example of a VHT-SIG A frame that may be used by an access point to allow a terminal to operate in a power saving mode.

FIG. 14 illustrates an example of a VHT-SIG A frame that may be used by an access point to allow a terminal to operate in a power saving mode.

The access point may notify terminals about whether the access point allows each of the terminal to operate in a power management mode at the beginning of a downlink MU TXOP duration.

For example, when the access point sets B22 of a VHT-SIG-A field to '0', it may indicate that the access point does not allow the corresponding terminal to operate in the power saving mode. When the access point sets B22 of the VHT-SIG-A field to '1', it may indicate that the access point allows the corresponding terminal to operate in the power saving mode.

Figure 15:
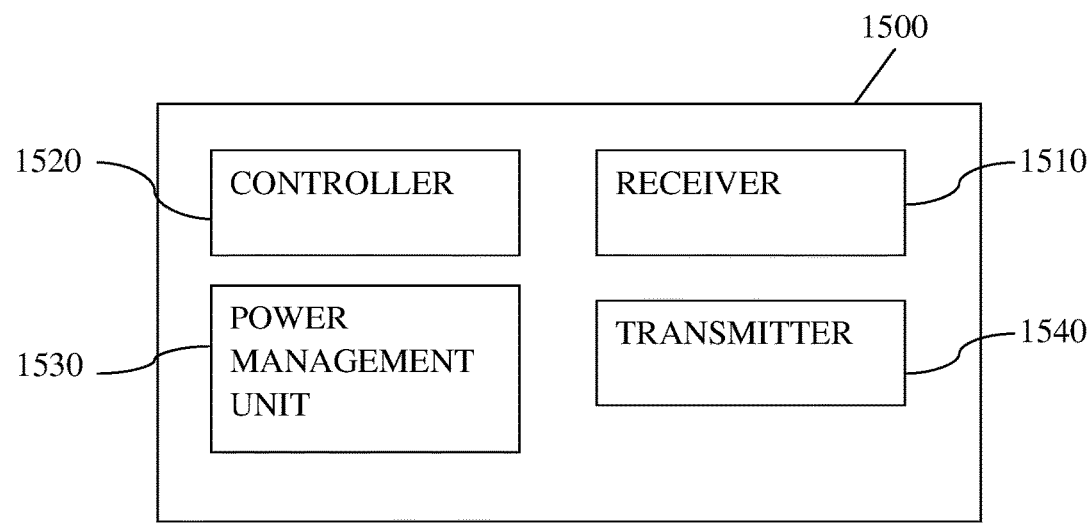
FIG. 15 is a diagram illustrating an example of a terminal.

FIG. 15 illustrates an example of a terminal.

Referring to FIG. 15, terminal 1500 includes a receiver 1510, a controller 1520, a power management unit 1530, and a transmitter 1540.

The receiver 1510 is configured to receive one or more data frames from an access point during a transmission opportunity (TXOP) of the access point. For example, the receiver 1510 may receive a data stream from the access point during a TXOP obtained by the access point.

The controller 1520 is configured to determine whether one a of a plurality of criterion is satisfied based on data included in the data frame received from the access point. For example, the criterion may include the first criterion, the second criterion, and the third criterion described herein with reference to FIGS. 1-14.

The first criterion may be satisfied if the terminal 1500 is not apart of the group of terminals that are served by the access point during the TXOP. For example, a group ID of a data frame may indicate that the corresponding terminal 1500 is not a member of the group for the TXOP.

In various aspects, the first criterion may not be satisfied. If the group ID of the data frame indicates that the corresponding terminal 1500 is a member of the group, the second criterion may be satisfied if the terminal 1500 is not to receive a data stream during the TXOP. For example, a number of state time space ($N_{STS}$) bit included in a very high throughput signal (VHT-SIG) field of the data frame received from the access point may indicate that the terminal 1500 is not going to be transmitted data during the TXOP.

In various aspects, the first and second criterion may not be satisfied. For example, a group ID of the data frame may indicate that the terminal 1500 is a member of the group, and a $N_{STS}$ bit included in a VHT-SIG field of the frame may indicate that the terminal 1500 is to be transmitted data during the TXOP. However, the third criterion may be satisfied if the terminal 1500 is completed receiving a data stream during the TXOP, and no more data frames are pending for the terminal 1500 at the access point. For example, a more data bit (MDB) included in a MAC header of the data frame or of another data frame may indicate that the transmission of the data from the access point to the terminal 1500 is completed for the TXOP.

The power management unit 1530 may be configured to adjust the power mode of the terminal. For example, if the controller 1520 determines that any one of the criterion of the plurality of criterion is satisfied, the power management unit 1530 may adjust the power mode of the terminal 1500 into a power saving mode for the duration of the TXOP. For example, the power saving mode may be a sleep mode or a doze state for the duration of the TXOP.

The controller 1520 may be configured to indicate to the access point that the terminal is capable of operating in the power saving mode. For example, the controller 1520 may set one or more bits of a capability element of a VHT control frame to indicate a power management mode of the terminal 1500. For example, referring again to FIG. 1, the VHT control frame may be used to indicate whether the terminal 1500 is capable of operating in the non-power save (non-PS) TXOP mode 130, in which the terminal remains continuously awake, a power save (PS) TXOP mode in 140 which the terminal may switch from an awake state to a doze state in which the terminal sleeps, and a power save mode 120 in which the terminal continuously sleeps.

The transmitter 1540 may be configured to transmit, to an access point, a data frame including the VHT control frame indicating the power management mode of the terminal.

As another example, the terminal 1500 may be configured to notify the access point whether the terminal 1500 is operating in the power save mode, the non-TXOP PS mode, or whether the terminal is operating in the TXOP PS mode. For example, the controller 1520 may set one or more bits of a VHT control field of a MAC header to indicate that the power management mode of the terminal corresponds to the power save mode, the non-TXOP PS mode, or the TXOP PS mode.

Figure 16:
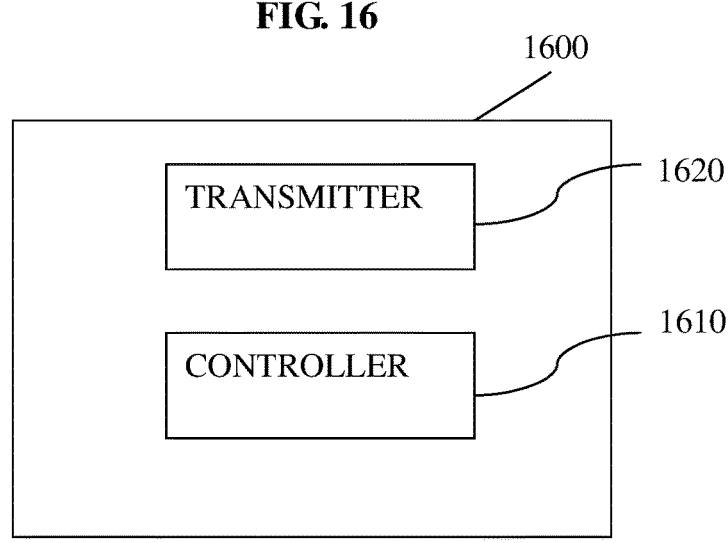
FIG. 16 is a diagram illustrating an example of an access point.

FIG. 16 illustrates an example of an access point.

Referring to FIG. 16, access point 1600 includes a controller 1610 and a transmitter 1620. The controller 1610 may be configured to determine whether a terminal is included in a TXOP obtained by the access point 1600. If the controller 1610 determines that a terminal is included in the TXOP, the controller 1610 may determine what portion of the TXOP the terminal is apart of.

For example, if the controller 1610 determines that the terminal is not included in a group of terminals that the access point 1600 may transmit to during the TXOP, the access point 1600 may notify the terminal that the terminal is not included in the group of terminals that the access point 1600 is able to transmit data to during the TXOP. For example, the controller 1610 may set a group ID field of a data frame such that the group ID field indicates that the terminal is not a member of the group for the TXOP. The transmitter 1620 may transmit to the terminal, the data frame comprising a group ID field that indicates that the terminal is not a member of the group for the TXOP.

As another example, if the controller 1610 determines that the terminal is included in a group of terminals that the access point 1600 is may transmit to during the TXOP, and that the access point 1600 does not have data to transmit to the terminal during the TXOP, the access point 1600 may notify the terminal that the access point 1600 does not have a data stream to transmit to the terminal during the TXOP. For example, the controller 1610 may set a number of state time space ($N_{STS}$) bit included in a very high throughput signal (VHT-SIG) field of the frame to indicate that the terminal is not going to be transmitted data during the TXOP.

The transmitter 1620 may transmit, to the terminal, a data frame comprising a number of state time space ($N_{STS}$) bit included in a very high throughput signal (VHT-SIG) field of the frame to indicate that the terminal is not going to be transmitted data during the TXOP.

As another example, if the controller 1610 determines that the terminal is included in a group of terminals that the access point 1600 is able to transmit to during the TXOP, and that the access point 1600 does have data to transmit to the terminal during the TXOP, the access point 1600 may notify the terminal that the access point 1600 has completed transmission of the data stream to the terminal for that respective TXOP. For example, the controller 1610 may set a more data bit (MDB) of a MAC header to indicate that transmission of data to the terminal is completed.

The transmitter 1620 may transmit, to the terminal, a data frame comprising a more data bit (MDB) of a MAC header set to indicate that transmission of data to the terminal is completed.

It should be appreciated that the examples described with reference to FIGS. 1-14 are also applicable to the terminal 1500 and the access point 1600 described with reference to FIGS. 15 and 16. Further description thereof is omitted for concision. According to various aspects, when a data stream to be transmitted to a terminal operating in a power saving mode is absent, it is possible to save a power by maintaining an operation state of the terminal in a sleep state during a TXOP.

According to various aspects, when a terminal operating in a power saving mode satisfies a predetermined criterion, it is possible to decrease a power consumption by changing an operation state of the terminal from an awake state to a sleep state.

According to various aspects, terminals that are to operate in a power saving mode among terminals operating in an active may transmit a frame in which a power management mode is set to the power saving mode and thereby be enabled to selectively determine whether to operate in the power saving mode.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and non-transitory computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A processor-implemented method of operating a terminal in a communication network, the method comprising:
   receiving, using one or more processors of the terminal and from an access point in the communication network, legacy information, a very high throughput signal (VHT-SIG) information, and medium access control (MAC) header information; and
   decoding, using the one or more processors, the legacy information, the VHT-SIG information, and the MAC header information, wherein
   a result of the decoding of the VHT-SIG information comprises information indicating whether the access point allows the terminal in a transmission opportunity (TXOP) power save mode to enter a doze state during a TXOP duration.

2. The method of claim 1, wherein the VHT-SIG information further comprises a group identifier (ID).

3. The method of claim 1, wherein the VHT-SIG information further comprises information of a number of streams for the terminal (NSTS).

4. The method of claim 1, wherein the VHT-SIG information further comprises information indicating whether a space time block coding (STBC) is used for the data frame.

5. The method of claim 1, wherein the MAC header information comprises a more data field indicating whether additional data is transmitted to the terminal.

6. The method of claim 1, further comprising receiving, from the access point, power saving information indicating whether the access point supports a power saving mode for the TXOP duration.

7. The method of claim 6, wherein the power saving information is included in a beacon frame or probe response frame.

8. A terminal in a communication network comprising:
one or more processors comprising:
a receiver configured to receive, from an access point in the communication network, legacy information and a very high throughput signal (VHT-SIG) information, and medium access control (MAC) header information; and
a controller configured to decode the legacy information, the VHT-SIG information, and the MAC header information, wherein
a result of the decoding of the VHT-SIG information comprises information indicating whether the access point allows the terminal in a transmission opportunity (TXOP) power save mode to enter a doze state during a TXOP duration.

9. The terminal of claim 8, wherein the VHT-SIG information further comprises a group identifier (ID).

10. The terminal of claim 8, wherein the VHT-SIG information further comprises information of a number of streams for the terminal (NSTS).

11. The terminal of claim 8, wherein the VHT-SIG information further comprises information indicating whether a space time block coding (STBC) is used for the data frame.

12. The terminal of claim 8, wherein the MAC header information comprises a more data field indicating whether additional data is transmitted to the terminal.

13. The terminal of claim 8, wherein the receiver is further configured to receive, from the access point, power saving information indicating whether the access point supports a power saving mode for the TXOP duration.

14. The terminal of claim 13, wherein the power saving information is included in a beacon frame or probe response frame.

* * * * *